(12) United States Patent
VanAmburgh

(10) Patent No.: US 12,479,370 B2
(45) Date of Patent: Nov. 25, 2025

(54) ACCESSORY RACK BRACE SYSTEM

(71) Applicant: Peter C. VanAmburgh, Roswell, GA (US)

(72) Inventor: Peter C. VanAmburgh, Roswell, GA (US)

(*) Notice: Subject to any disclaimer, the term of this patent is extended or adjusted under 35 U.S.C. 154(b) by 302 days.

(21) Appl. No.: 18/228,112

(22) Filed: Jul. 31, 2023

(65) Prior Publication Data

US 2025/0042339 A1    Feb. 6, 2025

(51) Int. Cl.
*B60R 9/06* (2006.01)

(52) U.S. Cl.
CPC ...................... *B60R 9/06* (2013.01)

(58) Field of Classification Search
CPC ....................................................... B60R 9/06
See application file for complete search history.

(56) References Cited

U.S. PATENT DOCUMENTS

| | | | |
|---|---|---|---|
| 3,260,929 A | 7/1966 | Hedgepeth | |
| 3,300,111 A | 1/1967 | Hedgepeth | |
| 5,129,559 A * | 7/1992 | Holliday | B60R 9/10 224/485 |
| 5,181,822 A * | 1/1993 | Allsop | B60R 9/06 414/462 |
| 5,330,312 A * | 7/1994 | Allsop | B60R 9/06 224/520 |
| 5,381,939 A | 1/1995 | Tippets | |
| 5,527,146 A * | 6/1996 | Allsop | B60R 9/12 414/462 |
| 5,573,165 A * | 11/1996 | Bloemer | B60R 9/10 224/523 |
| 5,579,972 A * | 12/1996 | Despain | B60R 9/06 224/521 |
| 5,586,702 A | 12/1996 | Sadler | |
| 5,649,656 A | 7/1997 | Davy | |
| 5,695,103 A * | 12/1997 | Duvernay | B60R 9/06 224/511 |
| 5,820,004 A | 10/1998 | Lane | |
| 5,938,092 A | 8/1999 | Johnson | |
| 6,237,824 B1 | 5/2001 | Bagley | |
| D446,755 S | 8/2001 | Adams et al. | |
| 6,293,451 B1 | 9/2001 | LeMay et al. | |
| 6,517,134 B2 | 2/2003 | Armstrong | |
| 6,662,983 B2 | 12/2003 | Lane et al. | |
| 7,066,365 B2 | 6/2006 | Brown | |
| 7,784,657 B2 | 8/2010 | Blakley | |
| 7,861,903 B2 | 1/2011 | Plaschka | |
| D632,635 S | 2/2011 | Farber | |
| D632,636 S | 2/2011 | Farber | |

(Continued)

*Primary Examiner* — Brian D Nash
(74) *Attorney, Agent, or Firm* — Shaddock Law Group, PC

(57) ABSTRACT

An accessory rack brace system including at least some of a rack system having a lower base unit, an upper base unit, and a sleeve element; a stabilizer plate attached or coupled to the rack system; and at least one bumper element, wherein each of the at least one bumper element is formed of a resilient portion of material, wherein the at least one bumper element is permanently or removably attached or coupled to a portion of the stabilizer plate, wherein the bumper element extends from a portion of the rack system and allows at least a portion of the bumper element to be urged against a surface to provide a degree of resilient tension between a portion of the surface and the rack system.

20 Claims, 29 Drawing Sheets

(56) References Cited

U.S. PATENT DOCUMENTS

| | | |
|---|---|---|
| D632,637 S | 2/2011 | Farber |
| D632,638 S | 2/2011 | Farber |
| 7,886,948 B2 | 2/2011 | Kerr |
| 8,430,286 B1 | 4/2013 | Patrick |
| 9,346,411 B1 | 5/2016 | VanAmburgh |
| 9,694,759 B1 | 7/2017 | VanAmburgh |
| 11,059,428 B1* | 7/2021 | Weil ........................ B60R 9/045 |
| 2005/0205630 A1 | 9/2005 | Cooper et al. |
| 2010/0213226 A1 | 8/2010 | Gray |
| 2012/0193380 A1 | 8/2012 | McMurtrie |
| 2015/0083769 A1* | 3/2015 | Williams .................. B60R 9/10 |
| | | 224/488 |
| 2023/0311780 A1* | 10/2023 | Rodgers .................... B60R 9/10 |
| | | 224/42.13 |
| 2024/0140323 A1* | 5/2024 | Heacock .................. B60R 9/06 |

\* cited by examiner

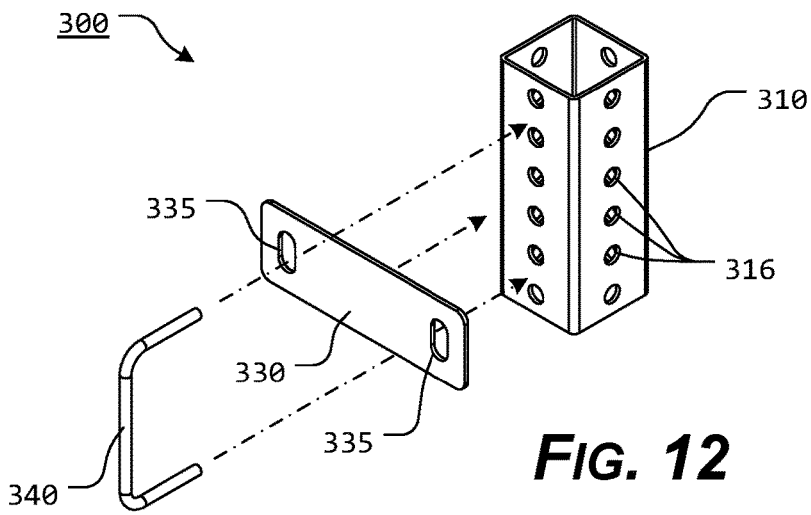
*FIG. 12*
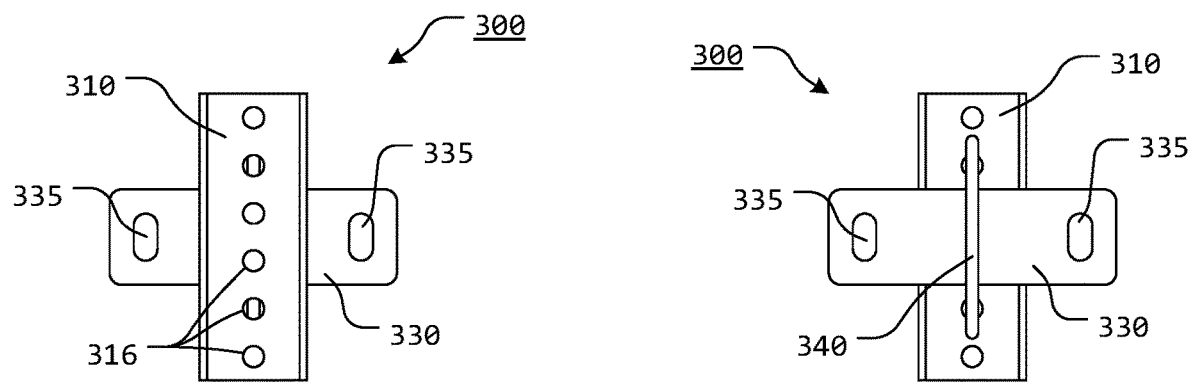
*FIG. 13*　　　*FIG. 14*

ACCESSORY RACK BRACE SYSTEM

CROSS-REFERENCE TO RELATED APPLICATIONS

None.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISC APPENDIX

Not Applicable.

NOTICE OF COPYRIGHTED MATERIAL

The disclosure of this patent document contains material that is subject to copyright protection. The copyright owner has no objection to the reproduction by anyone of the patent document or the patent disclosure, as it appears in the Patent and Trademark Office patent file or records, but otherwise reserves all copyright rights whatsoever. Unless otherwise noted, all trademarks and service marks identified herein are owned by the applicant.

BACKGROUND OF THE PRESENT DISCLOSURE

1. Field of the Present Disclosure

The present disclosure relates generally to the field of vehicle accessories. More specifically, the present disclosure relates to a hitch mounted accessory rack brace system.

2. Description of Related Art

It is generally known to attach various platforms for carriers, such as, for example, cargo platforms and bicycle carriers to a vehicle using the vehicle tow hitch. Such platforms or carriers are typically attached to the vehicle tow hitch and extend from the rear of the vehicle to provide additional space for carrying various items, especially items that are too large to fit within the interior of the vehicle.

It is also generally known to attach or support various items or brackets to the roof of a vehicle. Roof racks allow items to be carried above the vehicle.

Any discussion of documents, acts, materials, devices, articles, or the like, which has been included in the present specification is not to be taken as an admission that any or all of these matters form part of the prior art base or were common general knowledge in the field relevant to the present disclosure as it existed before the priority date of each claim of this application.

BRIEF SUMMARY OF THE PRESENT DISCLOSURE

However, typical vehicle hitch mounted brackets and rack systems have various shortcomings. For example, if a vehicle includes a spare tire, it can be impossible to use a known hitch mounted bracket or rack system, as the tire occupies too much of the space adjacent the vehicle tow hitch. When items are placed on a roof rack, unwanted weight and stress can be placed upon the vehicle roof. Additionally, roof racks cannot typically be used with soft-top or convertible vehicles.

The present disclosure provides a vehicle accessory rack brace system that overcomes the shortcomings of known accessory rack brace systems and provides a hitch mounted accessory pack system or rack system that can be used with soft-top vehicles and can be used with an externally mounted spare tire.

The present disclosure provides a cantilevered, horizontal rack system elevated above the roof of the vehicle. In various exemplary embodiments, the cantilever design provides two crossbars for attaching/securing gear. Additionally, a strap system may optionally be employed to specifically address movement of the vertical structure of the rack both laterally as well as forward and rearward. In various exemplary, nonlimiting embodiments, the strap system is capable of connecting the accessory rack brace system to both the vehicle's bumper as well as an externally mounted spare tire. Thus, in various exemplary, nonlimiting embodiments, the present disclosure may optionally allow the carrying of kayaks, stand-up paddleboards, bicycles, other sporting cargo, and building materials such as lumber, ladders, and piping elevated over the roofline of the vehicle.

In various exemplary, non-limiting embodiments, the accessory rack brace system of the present disclosure comprises a lower base unit that engages the vehicles towing hitch and acts as a vertical support frame, an upper base unit that serves as a horizontal support frame, crossbar assemblies for suspending loads, and a center-point adjustable sleeve assembly. The rack system also includes a set of straps to limit movement of the horizontal and vertical frames when attached to the vehicle. A hitch connection is provided at the lower end of the lower base unit. The lower base unit serves as the vertical support frame for the upper base unit. The upper base unit is cantilevered over the vehicle to provide an elevated rack system above the roof of the vehicle.

In various exemplary, nonlimiting embodiments, the accessory rack brace system of the present disclosure provides an accessory rack system that includes one or more accessory arms extending from the sleeve element.

In various exemplary, nonlimiting embodiments, the accessory rack brace system of the present disclosure provides an accessory rack system that includes an arm beam attached or coupled to the sleeve element, wherein the arm beam comprises an elongate portion of material extending from a first end portion to a second end portion and two or more accessory arms attached or coupled to the arm beam, wherein a first accessory arm extends from the first end portion of the arm beam and where in a second accessory arm extends from the second end portion of the arm beam.

In various exemplary, nonlimiting embodiments, the accessory rack brace system of the present disclosure provides an accessory rack system that includes at least two accessory arms extending from the sleeve element, wherein the accessory arms are attached or coupled to the sleeve element. Optionally, the at least two accessory arms are attached or coupled to the sleeve element via an arm beam.

In various exemplary, nonlimiting embodiments, the accessory rack brace system of the present disclosure provides an accessory rack system that includes a rack system having a lower base unit, an upper base unit, and a sleeve element; a stabilizer plate attached or coupled to the rack system; and at least one bumper element, wherein each of the at least one bumper element is formed of a resilient portion of material, wherein the at least one bumper element is permanently or removably attached or coupled to a portion of the stabilizer plate, wherein the bumper element extends from a portion of the rack system and allows at least a portion of the bumper element to be urged against a surface to provide a degree of resilient tension between a portion of the surface and the rack system.

In various exemplary, nonlimiting embodiments, at least two bumper elements are permanently or removably attached or coupled to the stabilizer plate, at spaced apart locations.

In various exemplary, nonlimiting embodiments, the stabilizer plate is attached or coupled to a portion of the rack system via welding.

In various exemplary, nonlimiting embodiments, the stabilizer plate is attached or coupled to a hitch beam vertical support of the lower base unit.

In various exemplary, nonlimiting embodiments, the bumper element extends from a portion of the rack system and allows at least a portion of the bumper element to be urged against a surface of a vehicle to provide a degree of resilient tension between a portion of the surface of the vehicle and the rack system.

In various exemplary, nonlimiting embodiments, at least one support strut is attached or coupled between the stabilizer plate and a portion of the upper base unit.

In various exemplary, nonlimiting embodiments, at least one support strut is attached or coupled between the stabilizer plate and a crossbar end plate of the upper base unit.

In various exemplary, nonlimiting embodiments, the accessory rack brace system of the present disclosure provides an accessory rack system that includes a rack system having a lower base unit, an upper base unit, and a sleeve element; a stabilizer rack attached or coupled to the rack system, wherein the stabilizer rack includes a rack arm beam and a rack accessory arm extending from opposing ends or end portions of the rack arm beam, wherein each the rack accessory arm, wherein a respective accessory arm end plate is attached or coupled to each respective terminal end of each of the rack accessory arms; at least one stabilizer bracket, wherein the at least one stabilizer bracket includes a first stabilizer bracket portion and a second stabilizer bracket portion, wherein a portion of the first stabilizer bracket portion of the at least one stabilizer bracket is attached or coupled to at least one of the accessory arm end plates; and at least one bumper element, wherein each of the at least one bumper element is formed of a resilient portion of material, wherein the at least one bumper element is permanently or removably attached or coupled to a portion of the second stabilizer bracket portion, wherein the bumper element extends from a portion of the second stabilizer bracket portion and allows at least a portion of the bumper element to be urged against a surface to provide a degree of resilient tension between a portion of the surface and the rack system.

In various exemplary, nonlimiting embodiments, the stabilizer rack is attached or coupled to the rack system via a sleeve element.

In various exemplary, nonlimiting embodiments, the rack accessory arms extend from the rack arm beam, such that the longitudinal axes, AL, of the rack accessory arms are each substantially parallel to one another.

The accessory rack brace system of claim 9, further comprising at least two stabilizer brackets, wherein a respective portion of each of the at least two stabilizer brackets is attached or coupled to a respective one of the accessory arm end plates.

In various exemplary, nonlimiting embodiments, at least one support strut is attached or coupled between the stabilizer rack and a portion of the upper base unit.

In various exemplary, nonlimiting embodiments, at least one support strut is attached or coupled between the stabilizer rack and a crossbar end plate of the upper base unit.

In various exemplary, nonlimiting embodiments, at least one support strut is attached or coupled between the stabilizer bracket and a portion of the upper base unit.

In various exemplary, nonlimiting embodiments, at least one support strut is attached or coupled between the stabilizer bracket and a crossbar end plate of the upper base unit.

In various exemplary, nonlimiting embodiments, the accessory rack brace system of the present disclosure provides an accessory rack system that includes a rack system having a lower base unit, an upper base unit, and a sleeve element; a stabilizer rack attached or coupled to the rack system, wherein the stabilizer rack includes a rack arm beam and a rack accessory arm extending from opposing ends or end portions of the rack arm beam, wherein each the rack accessory arm, wherein a respective accessory arm end plate is attached or coupled to each respective terminal end of each of the rack accessory arms; at least one stabilizer plate, wherein a portion of the stabilizer plate is attached or coupled to each of the accessory arm end plates; and at least one bumper element, wherein each of the at least one bumper element is formed of a resilient portion of material, wherein the at least one bumper element is permanently or removably attached or coupled to a portion of the stabilizer plate, wherein the bumper element extends from a portion of the stabilizer plate and allows at least a portion of the bumper element to be urged against a surface to provide a degree of resilient tension between a portion of the surface and the rack system.

In various exemplary, nonlimiting embodiments, at least one support strut is attached or coupled between the stabilizer rack and a portion of the upper base unit.

In various exemplary, nonlimiting embodiments, at least one support strut is attached or coupled between the stabilizer rack and a crossbar end plate of the upper base unit.

In various exemplary, nonlimiting embodiments, at least one support strut is attached or coupled between the stabilizer plate and a portion of the upper base unit.

In various exemplary, nonlimiting embodiments, at least one support strut is attached or coupled between the stabilizer plate and a crossbar end plate of the upper base unit.

Accordingly, the present disclosure provides an accessory rack brace system that allows items to be transported above a vehicle.

The present disclosure separately and optionally provides an accessory rack brace system that can be used with soft-top vehicles.

The present disclosure separately and optionally provides an accessory rack brace system that can be used with vehicles having an externally mounted spare tire.

The present disclosure separately and optionally provides an accessory rack brace system that can be easily installed and uninstalled by a user.

The present disclosure separately and optionally provides an accessory rack brace system that allows at least a portion of the bumper element to be urged against a surface of a vehicle to provide a degree of resilient tension between a portion of the surface of the vehicle and the rack system.

These and other aspects, features, and advantages of the present disclosure are described in or are apparent from the following detailed description of the exemplary, non-limiting embodiments of the present disclosure and the accompanying figures. Other aspects and features of embodiments of the present disclosure will become apparent to those of ordinary skill in the art upon reviewing the following description of specific, exemplary embodiments of the present disclosure in concert with the figures.

While features of the present disclosure may be discussed relative to certain embodiments and figures, all embodiments of the present disclosure can include one or more of the features discussed herein. Further, while one or more embodiments may be discussed as having certain advantageous features, one or more of such features may also be used with the various embodiments of the systems, methods, and/or apparatuses discussed herein. In similar fashion, while exemplary embodiments may be discussed below as device, system, or method embodiments, it is to be understood that such exemplary embodiments can be implemented in various devices, systems, and methods of the present disclosure.

Any benefits, advantages, or solutions to problems that are described herein with regard to specific embodiments are not intended to be construed as a critical, required, or essential feature(s) or element(s) of the present disclosure or the claims.

BRIEF DESCRIPTION OF THE SEVERAL VIEWS OF THE DRAWINGS

As required, detailed exemplary embodiments of the present disclosure are disclosed herein; however, it is to be understood that the disclosed embodiments are merely exemplary of the present disclosure that may be embodied in various and alternative forms, within the scope of the present disclosure. The figures are not necessarily to scale; some features may be exaggerated or minimized to illustrate details of particular components. Therefore, specific structural and functional details disclosed herein are not to be interpreted as limiting, but merely as a basis for the claims and as a representative basis for teaching one skilled in the art to employ the present disclosure.

The exemplary embodiments of the present disclosure will be described in detail, with reference to the following figures, wherein like reference numerals refer to like parts throughout the several views, and wherein:

FIG. 12 illustrates an exploded, perspective view of the various components of the center-point adjustable sleeve assembly of an exemplary embodiment of the hitch mounted accessory rack system, according to this disclosure;

FIG. 13 illustrates a front view of the assembled components of the center-point adjustable sleeve assembly of an exemplary embodiment of the hitch mounted accessory rack system, according to this disclosure;

FIG. 14 illustrates a rear view of the assembled components of the center-point adjustable sleeve assembly of an exemplary embodiment of the hitch mounted accessory rack system, according to this disclosure;

DETAILED DESCRIPTION OF EXEMPLARY EMBODIMENTS OF THE PRESENT DISCLOSURE

Figure 1:
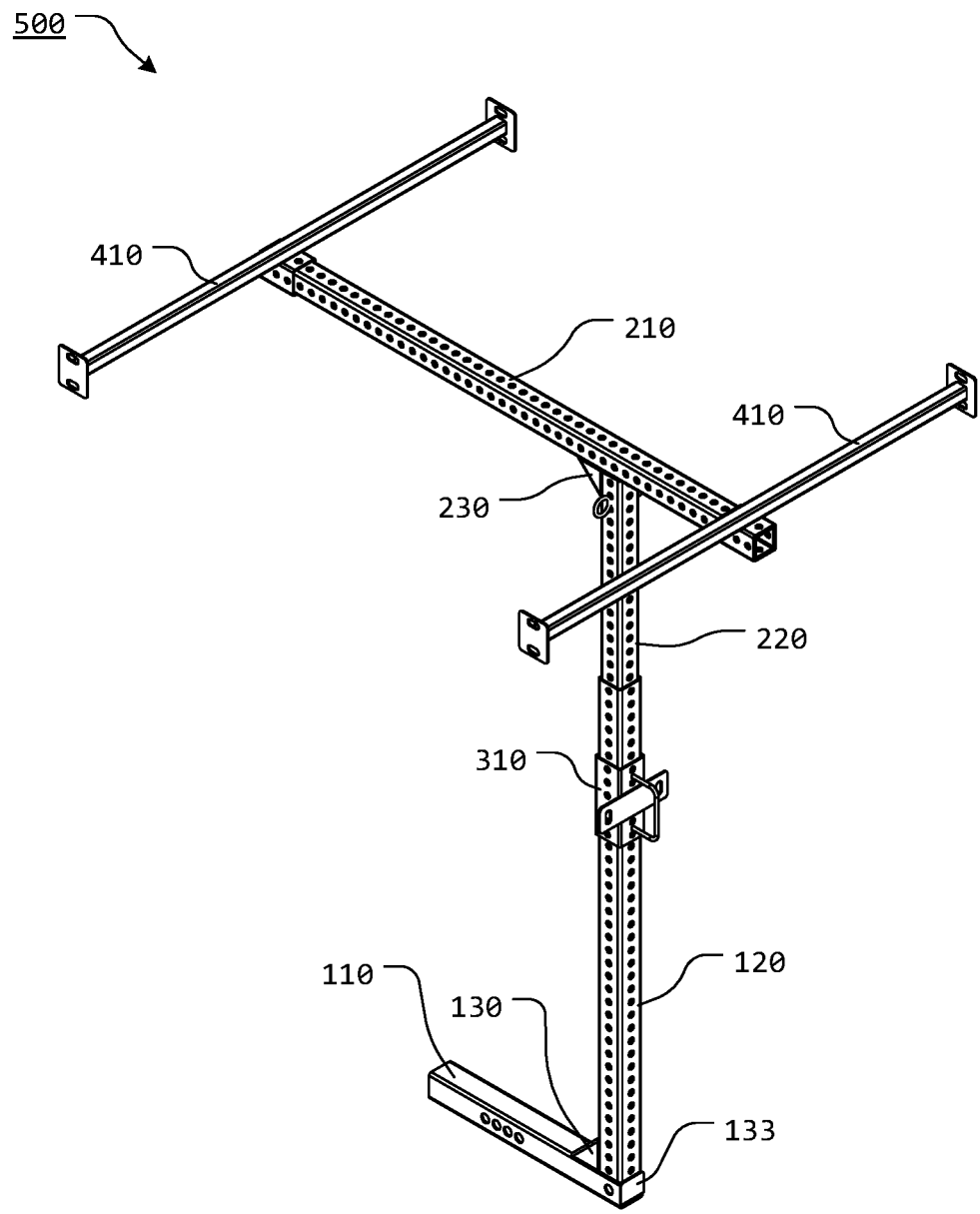
FIG. 1 illustrates a perspective view of a first exemplary embodiment of the hitch mounted accessory rack system, according to this disclosure.
Figure 2:
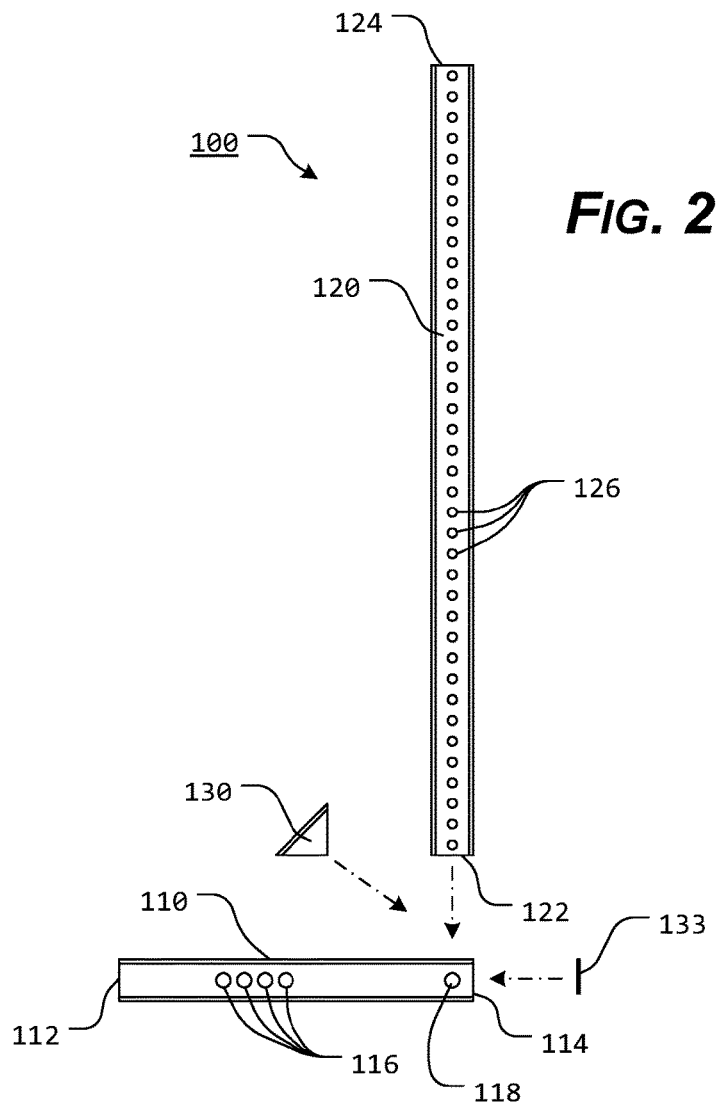
FIG. 2 illustrates a more detailed, exploded view of the components of the lower base unit of an exemplary embodiment of the hitch mounted accessory rack system, according to this disclosure.
Figure 3:
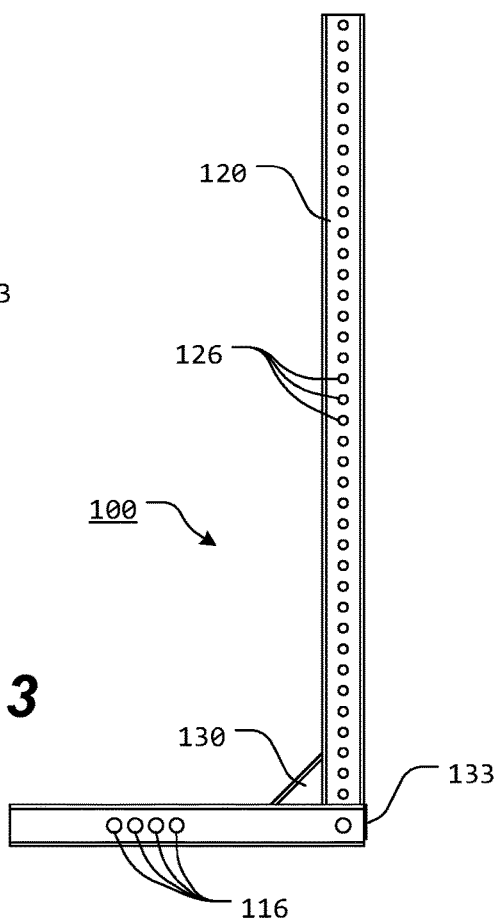
FIG. 3 illustrates a more detailed view of the assembled components of the lower base unit of an exemplary embodiment of the hitch mounted accessory rack system, according to this disclosure.
Figure 4:
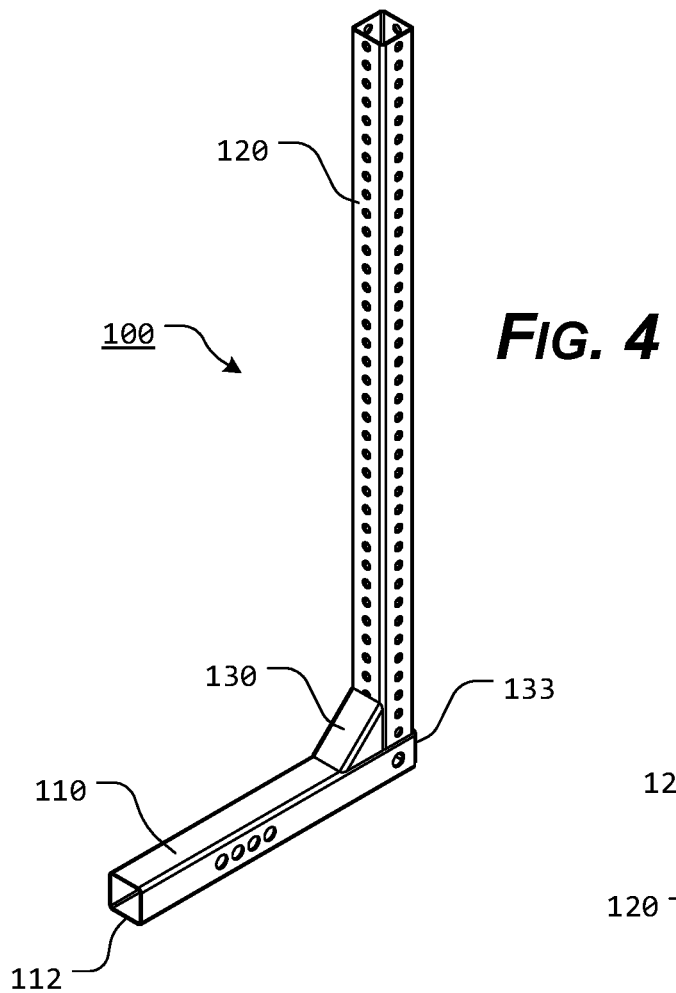
FIG. 4 illustrates a front perspective view of the assembled components of the lower base unit of an exemplary embodiment of the hitch mounted accessory rack system, according to this disclosure.
Figure 5:
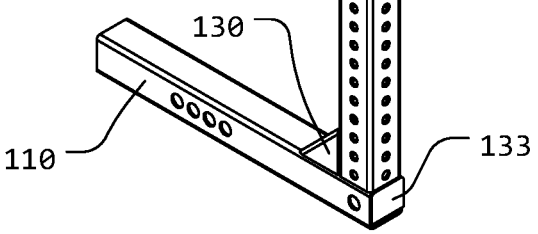
FIG. 5 illustrates a rear perspective view of the assembled components of the lower base unit of an exemplary embodiment of the hitch mounted accessory rack system, according to this disclosure.
Figure 6:
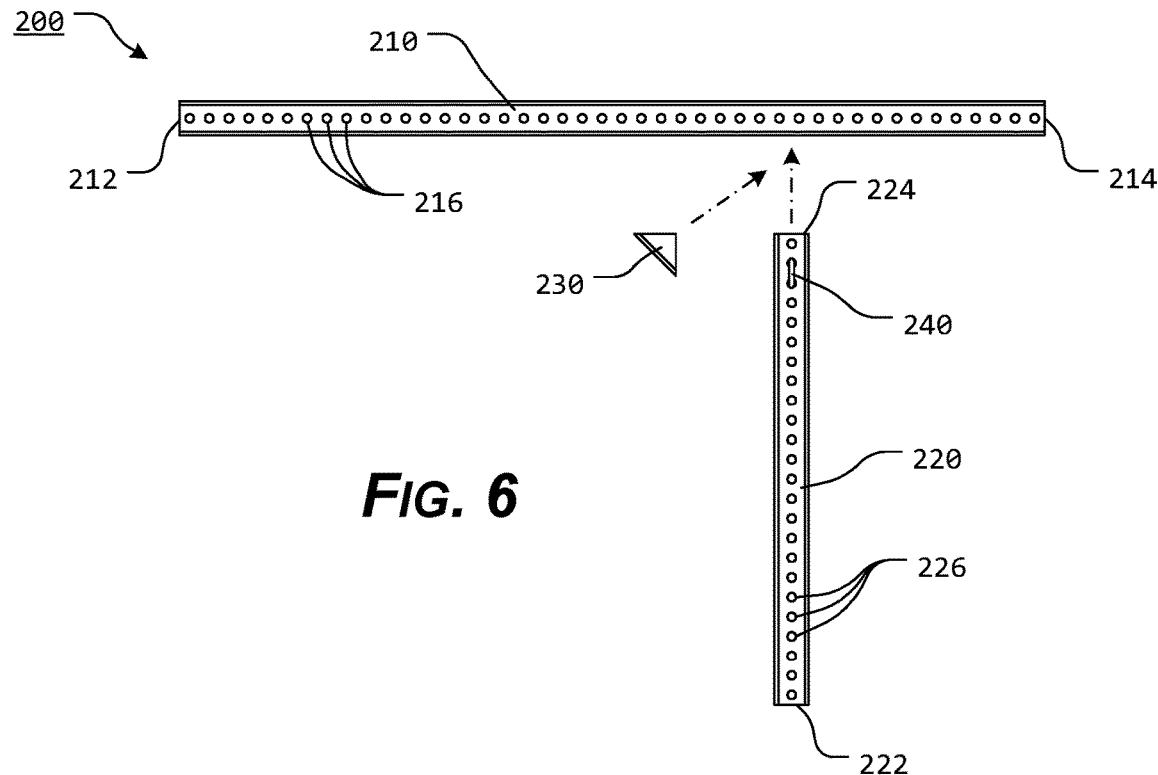
FIG. 6 illustrates a side, exploded view of the components of the upper base unit of an exemplary embodiment of the hitch mounted accessory rack system, according to this disclosure.
Figure 7:
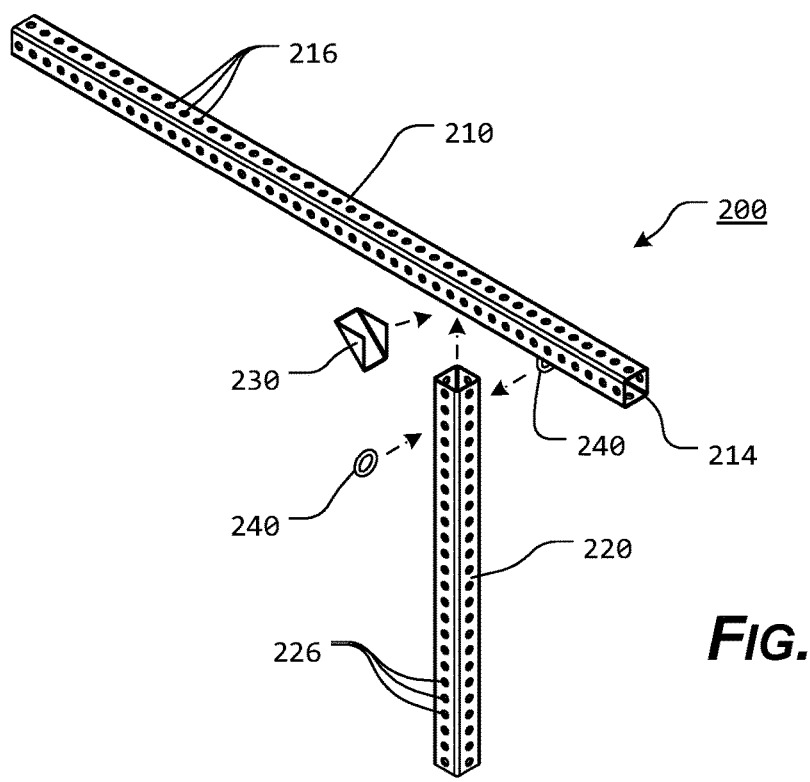
FIG. 7 illustrates a perspective, exploded view of the components of the upper base unit of an exemplary embodiment of the hitch mounted accessory rack system, according to this disclosure.
Figure 8:
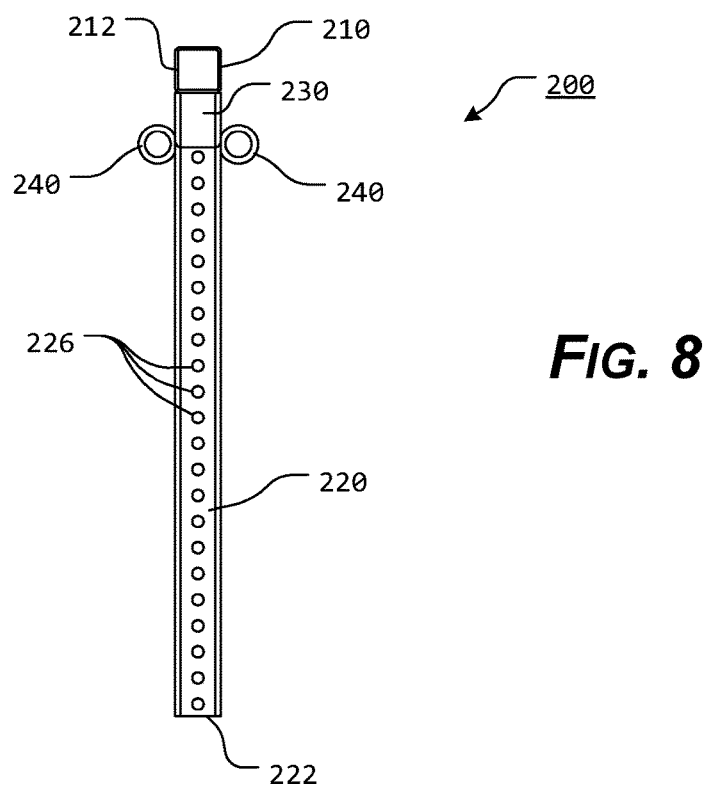
FIG. 8 illustrates a front view of the assembled components of the upper base unit of an exemplary embodiment of the hitch mounted accessory rack system, according to this disclosure.
Figure 9:
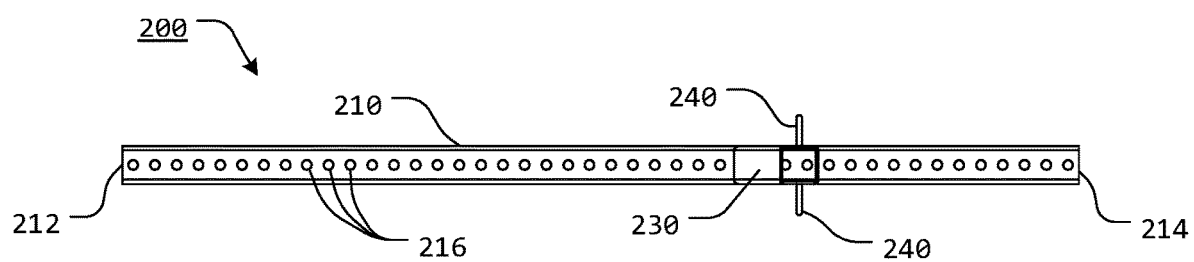
FIG. 9 illustrates a bottom view of the assembled components of the upper base unit of an exemplary embodiment of the hitch mounted accessory rack system, according to this disclosure.
Figure 10:
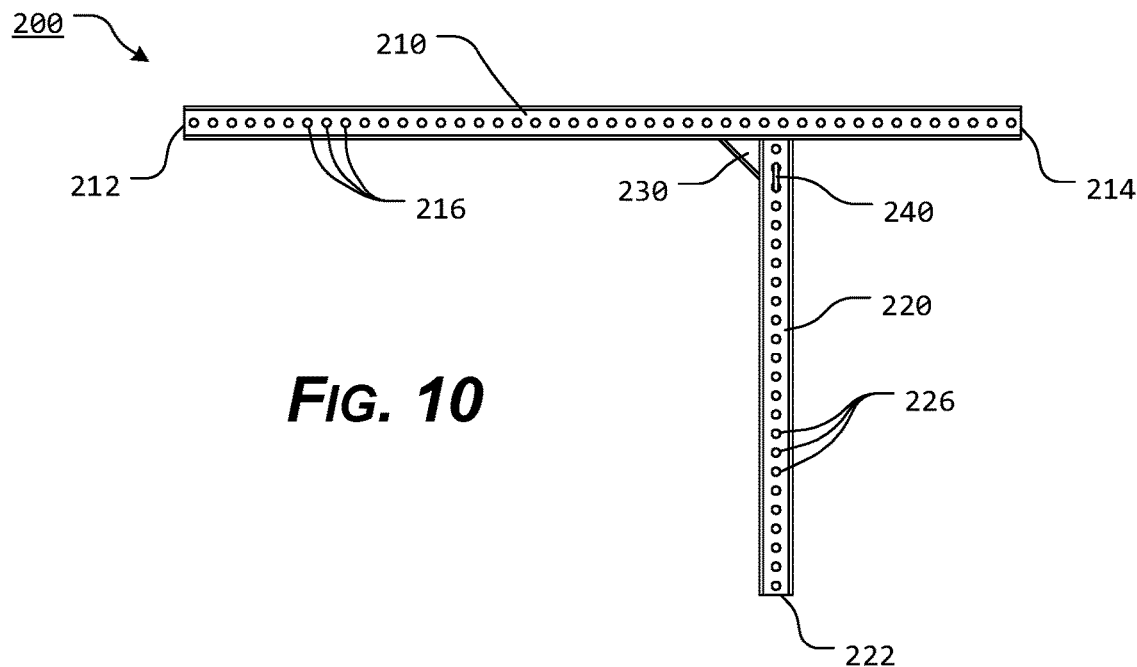
FIG. 10 illustrates a right side view of the assembled components of the upper base unit of an exemplary embodiment of the hitch mounted accessory rack system, according to this disclosure.
Figure 11:
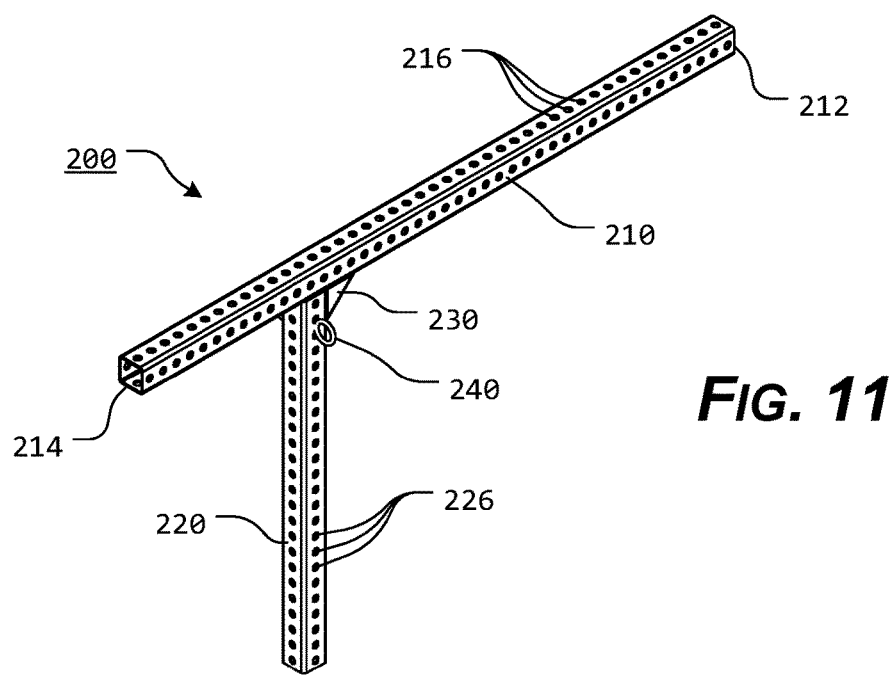
FIG. 11 illustrates a left, rear perspective view of the assembled components of the upper base unit of an exemplary embodiment of the hitch mounted accessory rack system, according to this disclosure.
Figure 15:
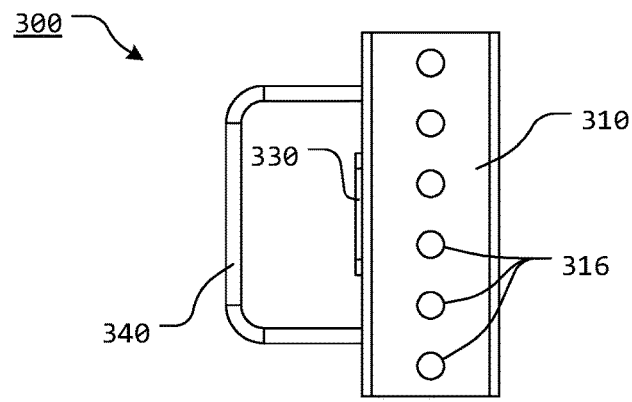
FIG. 15 illustrates a right, side view of the assembled components of the center-point adjustable sleeve assembly of an exemplary embodiment of the hitch mounted accessory rack system, according to this disclosure.
Figure 16:
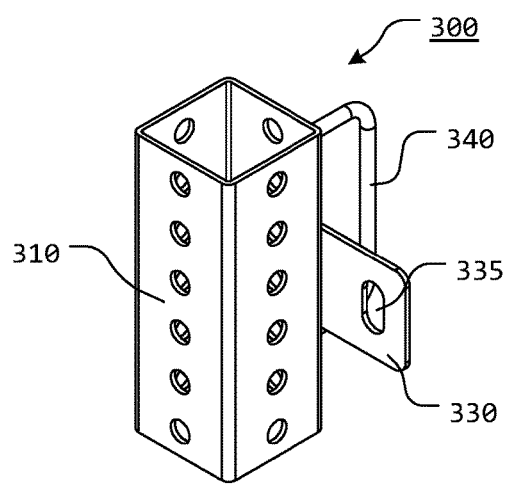
FIG. 16 illustrates a front, perspective view of the assembled components of the center-point adjustable sleeve assembly of an exemplary embodiment of the hitch mounted accessory rack system, according to this disclosure.
Figure 17:
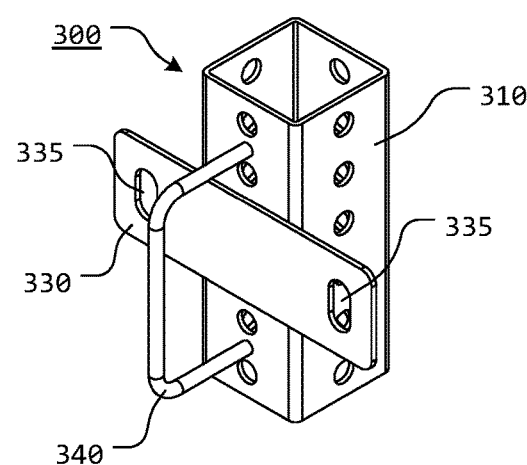
FIG. 17 illustrates a rear, perspective view of the assembled components of the center-point adjustable sleeve assembly of an exemplary embodiment of the hitch mounted accessory rack system, according to this disclosure.
Figure 18:
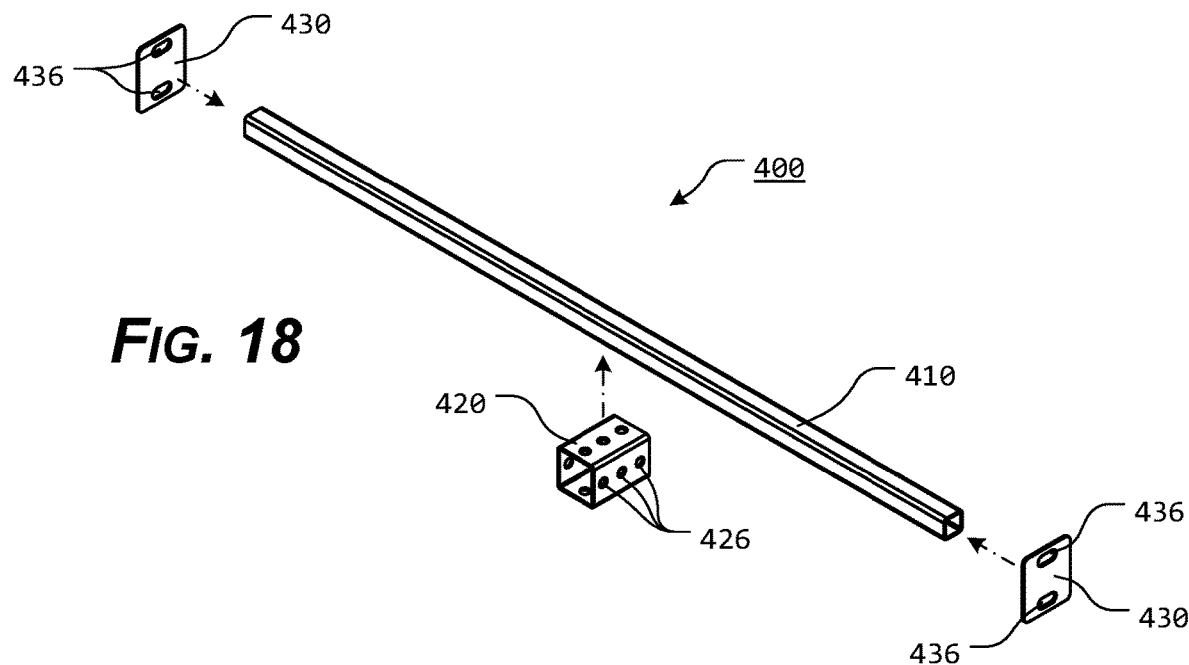
FIG. 18 illustrates an exploded, perspective view of the various components of the crossbar assembly of an exemplary embodiment of the hitch mounted accessory rack system, according to this disclosure.
Figure 19:
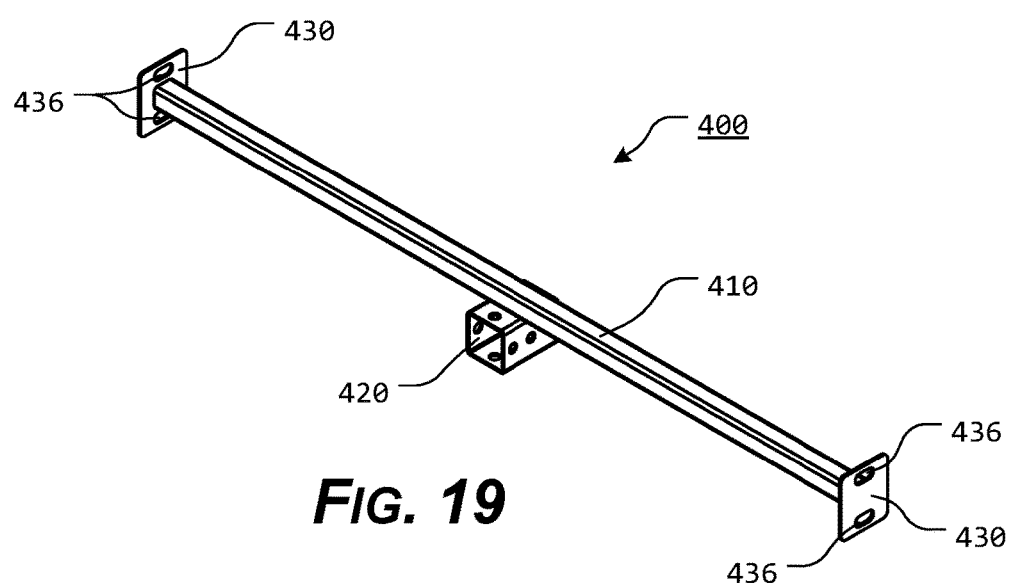
FIG. 19 illustrates a perspective view of the assembled components of the crossbar assembly of an exemplary embodiment of the hitch mounted accessory rack system, according to this disclosure.
Figure 20:
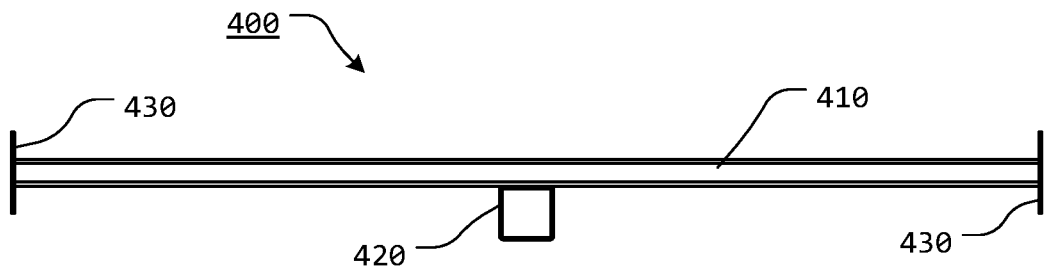
FIG. 20 illustrates a front view of the assembled components of the crossbar assembly of an exemplary embodiment of the hitch mounted accessory rack system, according to this disclosure.
Figure 21:
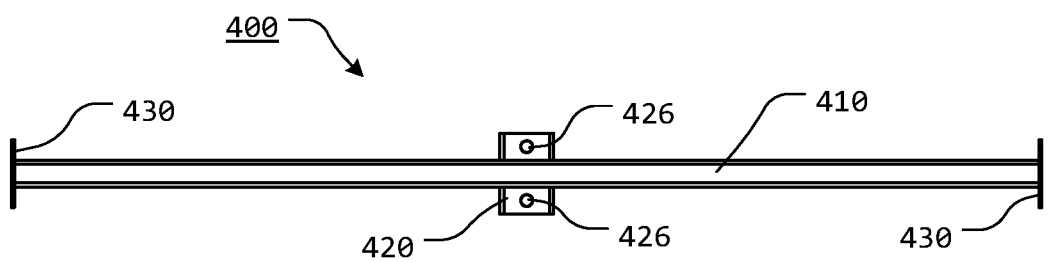
FIG. 21 illustrates a top view of the assembled components of the crossbar assembly of an exemplary embodiment of the hitch mounted accessory rack system, according to this disclosure.
Figure 22:
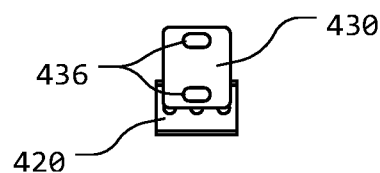
FIG. 22 illustrates a side view of the assembled components of the crossbar assembly of an exemplary embodiment of the hitch mounted accessory rack system, according to this disclosure.
Figure 23:
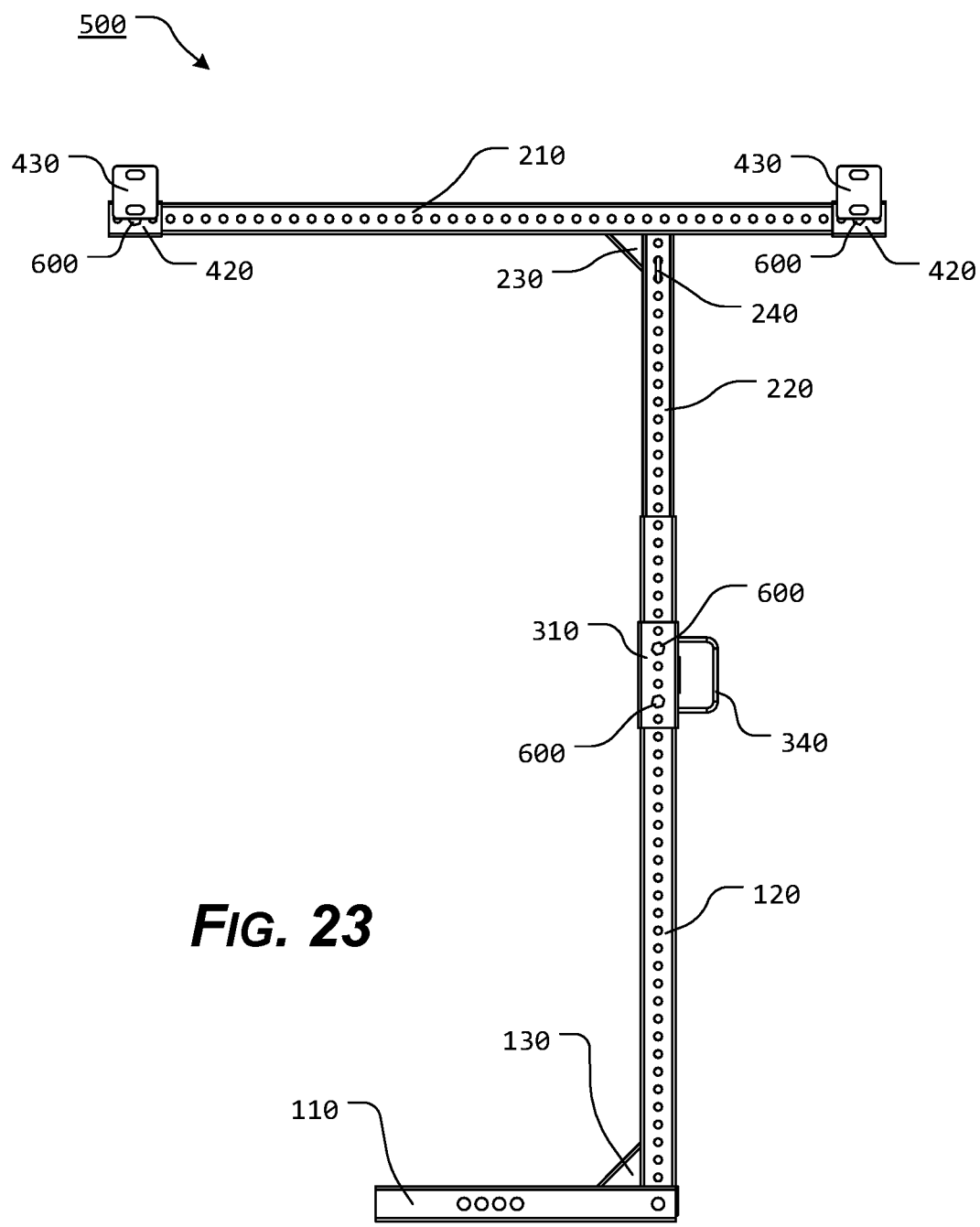
FIG. 23 illustrates a side view of the assembled components of the rack system of an exemplary embodiment of the hitch mounted accessory rack system, according to this disclosure.
Figure 24:
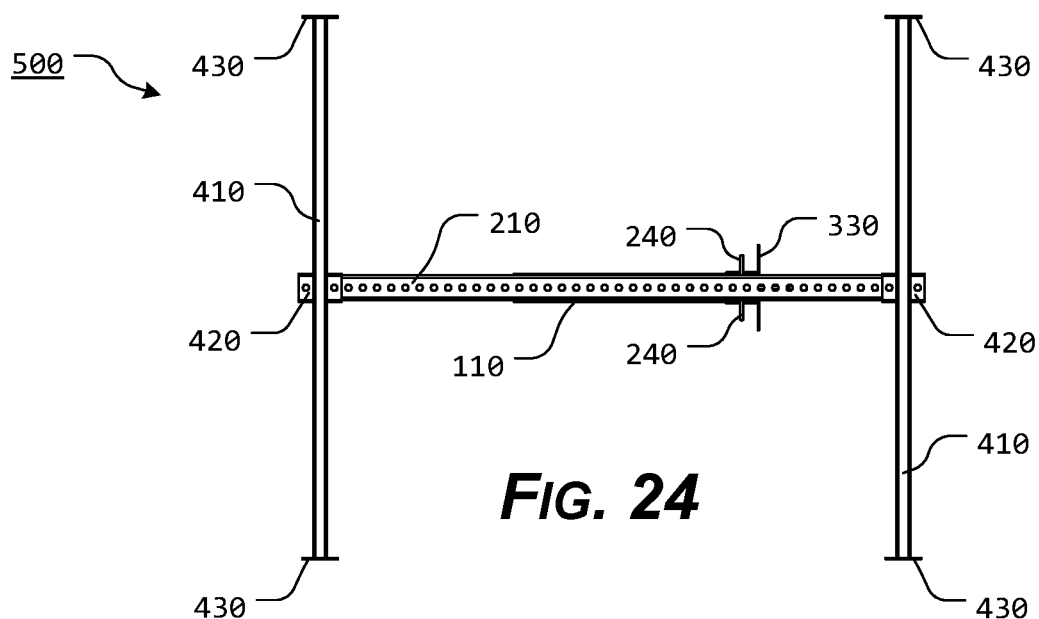
FIG. 24 illustrates a top view of the assembled components of the rack system of an exemplary embodiment of the hitch mounted accessory rack system, according to this disclosure.
Figure 25:
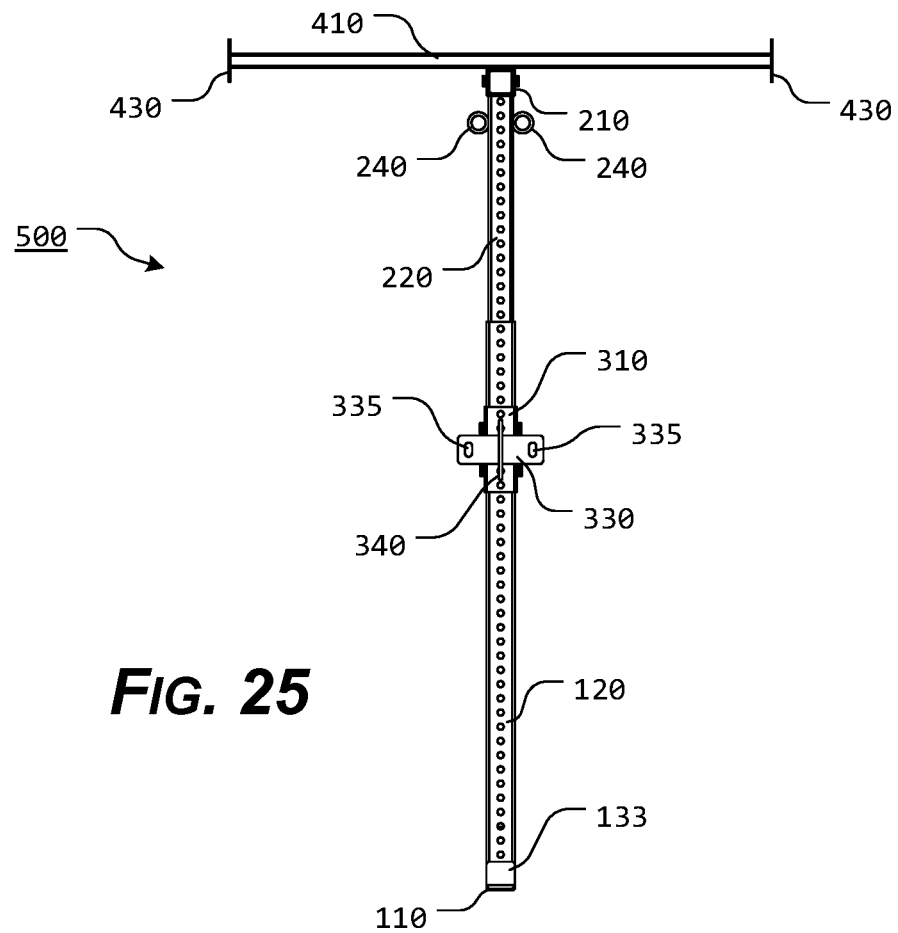
FIG. 25 illustrates a rear view of the assembled components of the rack system of an exemplary embodiment of the hitch mounted accessory rack system, according to this disclosure.
Figure 26:
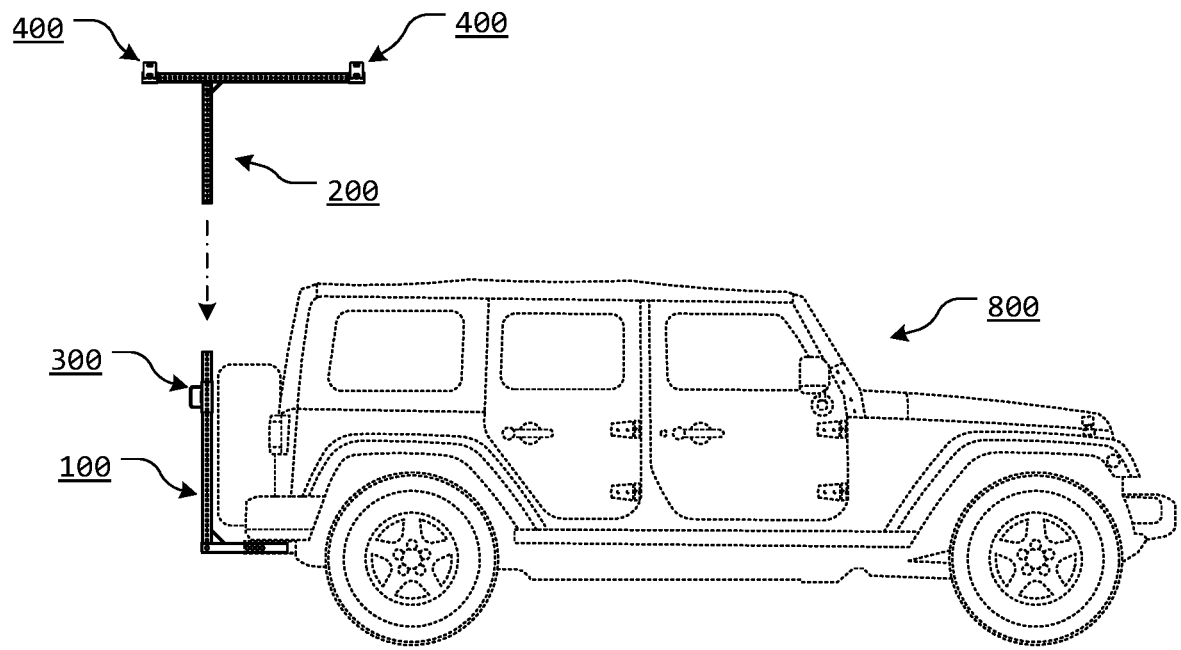
FIG. 26 illustrates a side view of the rack system of an exemplary embodiment of the hitch mounted accessory rack system being installed on an exemplary vehicle, according to this disclosure.
Figure 27:
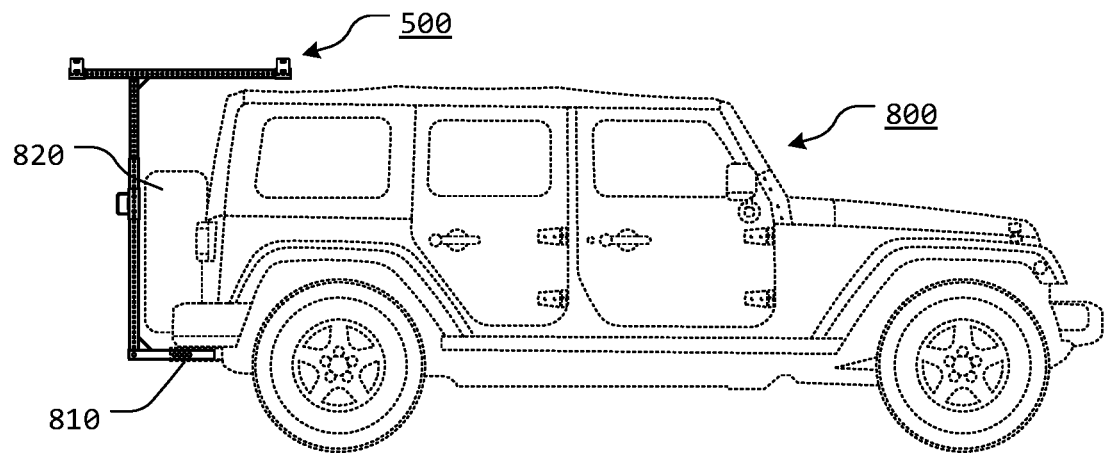
FIG. 27 illustrates a side view of the rack system of an exemplary embodiment of the hitch mounted accessory rack system partially installed on an exemplary vehicle, according to this disclosure.
Figure 28:
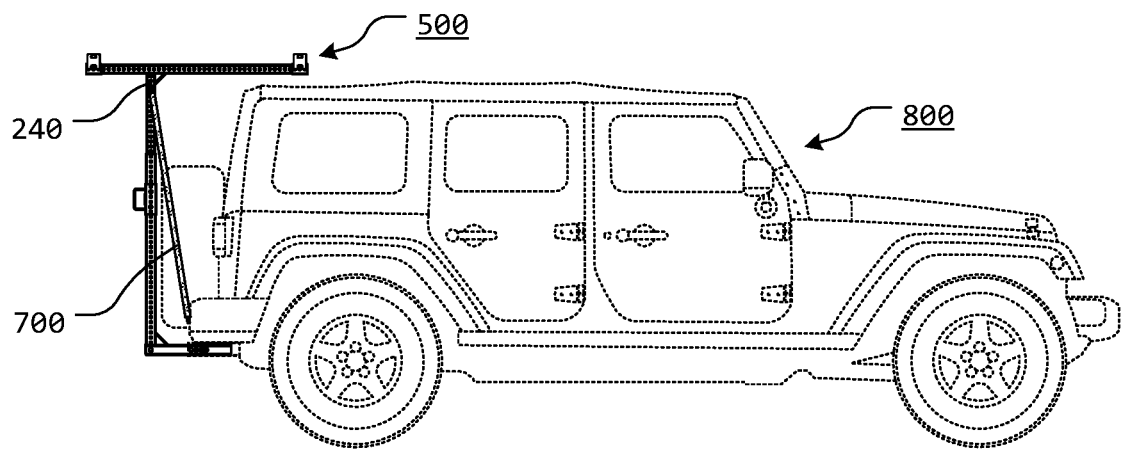
FIG. 28 illustrates a side view of the rack system of an exemplary embodiment of the hitch mounted accessory rack system installed on an exemplary vehicle, according to this disclosure.
Figure 29:
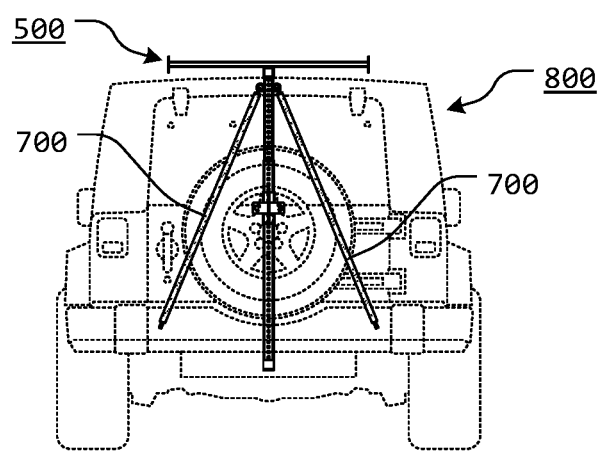
FIG. 29 illustrates a rear view of the rack system of an exemplary embodiment of the hitch mounted accessory rack system partially installed on an exemplary vehicle, according to this disclosure.

For simplicity and clarification, the design factors and operating principles of the accessory rack brace system according to this disclosure are explained with reference to various exemplary embodiments of an accessory rack brace system according to this disclosure. The basic explanation of the design factors and operating principles of the rack system is applicable for the understanding, design, and operation of the rack system of this disclosure. It should be appreciated that the accessory rack brace system can be adapted to many applications where an accessory rack brace system can be used.

As used herein, the word "may" is meant to convey a permissive sense (i.e., meaning "having the potential to"), rather than a mandatory sense (i.e., meaning "must"). Unless stated otherwise, terms such as "first" and "second", "right" and "left", "top" and "bottom", "upper" and "lower", and "horizontal" and "vertical" are used to arbitrarily distinguish between the exemplary embodiments and/or elements such terms describe. Thus, these terms are not necessarily intended to indicate temporal or other prioritization of such exemplary embodiments and/or elements.

As used herein, and unless the context dictates otherwise, the term "coupled" is intended to include both direct coupling (in which two elements that are coupled to each other contact each other) and indirect coupling (in which at least one additional element is located between the two elements). The term coupled, as used herein, is defined as connected, although not necessarily directly, and not necessarily mechanically. The terms "a" and "an" are defined as one or more unless stated otherwise.

Throughout this application, the terms "comprise" (and any form of comprise, such as "comprises" and "comprising"), "have" (and any form of have, such as "has" and "having"), "include", (and any form of include, such as "includes" and "including") and "contain" (and any form of contain, such as "contains" and "containing") are used as open-ended linking verbs. It will be understood that these terms are meant to imply the inclusion of a stated element, integer, step, or group of elements, integers, or steps, but not the exclusion of any other element, integer, step, or group of elements, integers, or steps. As a result, a system, method, or apparatus that "comprises", "has", "includes" or "contains" one or more elements possesses those one or more elements but is not limited to possessing only those one or more elements. Similarly, a method or process that "comprises", "has", "includes" or "contains" one or more operations possesses those one or more operations but is not limited to possessing only those one or more operations.

It should also be appreciated that, for simplicity and clarification, certain embodiments of the present disclosure may be described using terms such as "front", "back", "rear", "right", "left", "upper", "lower", "outer", and/or "inner". However, it should be understood that these terms are merely used to aid in understanding the present disclosure are not to be construed as limiting the systems, methods, devices, and/or apparatuses of the present disclosure. Additionally, it should be appreciated that, unless otherwise stated, the design factors and operating principles of the presently disclosed accessory rack brace system may optionally be used in a "mirror image" assembly, wherein elements shown and/or described as being included in or on a drive end portion may optionally be included in or on a non-drive end portion. Alternatively, certain of the elements that are shown and/or described as being included in or on a back portion may optionally be included in or on a front portion, or vice versa.

It should also be appreciated that the terms "hitch mounted accessory rack system", "accessory rack brace system", "rack system", "hitch mounted", and "vehicle" are used for basic explanation and understanding of the operation of the systems, methods, and apparatuses of this disclosure. Therefore, the terms "hitch mounted accessory rack system", "accessory rack brace system", "rack system", "hitch mounted", and "vehicle" are not to be construed as limiting the systems, methods, and apparatuses of this disclosure.

For simplicity and clarification, the accessory rack brace system of this disclosure will be described as being used in conjunction with a Jeep® (Jeep® is a registered trademark of Chrysler Group LLC) with or without an externally installed spare tire. However, it should be appreciated that these are merely exemplary embodiments of the accessory rack brace system and are not to be construed as essential to or limiting this disclosure. Thus, the accessory rack brace system of this disclosure may be utilized in conjunction with any vehicle having a tow hitch and can be used with or without an externally installed spare tire.

Turning now to the drawing FIGS., FIGS. 1-29 illustrate certain elements and/or aspects of a first exemplary embodiment of the hitch mounted accessory rack system, according to this disclosure. In illustrative, non-limiting embodiment(s) of this disclosure, as illustrated in FIGS. 1-29, the rack system 500 comprises a lower base unit 100, an upper base unit 200, a center-point adjustable sleeve assembly 300, crossbar assemblies 400, and support straps 700.

As illustrated most clearly in FIGS. 1-5, the lower base unit 100 includes a hitch beam 110, a hitch beam vertical support 120, and a hitch beam reinforcing corner 130. The hitch beam 110 comprises an elongate portion of material extending from a first end 112 to a second end 114. Typically, the hitch beam 110 (and at least a portion of the first end 112) comprises a portion of square, tubular material sized so as to be at least partially received within a vehicle tow hitch receiver tube 810. Alternatively, the hitch beam 110 may optionally comprise a portion of square, solid material. In various exemplary embodiments, the exterior dimension of each side of the hitch beam 110 is 2 inches. Alternatively, the exterior dimension of each side of the hitch beam 110 may be 1¼ inch to 2½ inches.

One or more hitch beam apertures 116 are formed through the hitch beam 110 so as to be aligned with the hitch pin aperture of a vehicle tow hitch receiver tube 810. The hitch beam apertures 116 allows the distance that the hitch beam 110 is received within a vehicle tow hitch receiver tube 810 to be adjusted and maintained when a hitch pin is positioned through the hitch pin apertures and the appropriately determined hitch beam aperture 116.

The hitch beam vertical support 120 comprises an elongate portion of tubular or at least partially tubular material extending from a first end 122 to a second end 124. Typically, the hitch beam vertical support 120 comprises a portion of square, tubular material of a similar size to that of the hitch beam 110.

The hitch beam vertical support 120 includes a plurality of hitch beam vertical support apertures 126 formed therethrough. In various exemplary embodiments, a longitudinal axis of each hitch beam vertical support aperture 126 is perpendicular to a longitudinal axis of the hitch beam vertical support 120. The hitch beam vertical support apertures 126 allow the center-point adjustable sleeve assembly 300 to be adjustably positioned along the hitch beam vertical support 120, at a desired position, as described below.

In various exemplary embodiments, the first end 122 of the hitch beam vertical support 120 is permanently attached or coupled to the hitch beam 110 proximate the second end 114 of the hitch beam 110, such that a longitudinal axis of the hitch beam 110 is substantially perpendicular to a longitudinal axis of the hitch beam vertical support 120. Typically, the hitch beam vertical support 120 is attached or coupled to the hitch beam 110 by welding. However, it should be appreciated that the hitch beam vertical support 120 may be permanently or removably attached or coupled to the hitch beam 110 by any desired method or device, such as, for example, by fasteners.

In certain exemplary, nonlimiting embodiments, a hitch beam reinforcing corner 130 is attached or coupled so as to join at least a portion of the hitch beam 110 to the hitch beam vertical support 120 in order to provide additional rigidity to the attached or coupled hitch beam 110 and the hitch beam vertical support 120.

A cap plate 133 may optionally be attached or coupled to the second end 114 of the hitch beam 110. In various exemplary embodiments, the plate 133 provides a decorative cover to the hitch beam 110. If the hitch beam 110 is hollow, the plate 133 also keeps debris or material from entering into an interior cavity of the hitch beam 110.

Once assembled, the lower base unit 100 is capable of engaging a vehicle tow hitch receiver tube 810 and acting as a vertical support frame for the rack system 500.

As illustrated most clearly in FIGS. 6-11, the upper base unit 200 includes a support beam 210, a support beam vertical support 220, a support beam reinforcing corner 230, and loops 240. The support beam 210 comprises an elongate portion of material extending from a first end 212 to a second end 214. Typically, the support beam 210 comprises a portion of square, tubular material sized so as to be at least partially received within at least a portion of the hitch beam vertical support 120. In various exemplary embodiments, the exterior dimension of each side of the support beam 210 is 1¾ inches. Alternatively, the exterior dimension of each side of the support beam 210 may be 1¼ inch to 2½ inches.

A plurality of support beam apertures 216 are formed through the support beam 210 so as to be aligned with the crossbar sleeve element apertures 426 of the crossbar assembly 400. The plurality of support beam apertures 216 allows the position of the crossbar assemblies 400 to be adjusted in relation to the support beam 210 and maintained in a desired position when one or more pins or bolts 600 is positioned through aligned, corresponding support beam apertures 216 and crossbar sleeve element apertures 426.

The support beam vertical support 220 comprises an elongate portion of tubular or at least partially tubular material extending from a first end 222 to a second end 224. Typically, the support beam vertical support 220 comprises a portion of square, tubular material of a similar size to that of the support beam 210.

In various exemplary embodiments, the exterior dimension of each side of the support beam vertical support 220 is 1¾ inches. However, it should be understood that the support beam vertical support 220 is sized so as to be at least partially received within an interior of the hitch beam vertical support 120. In this manner, the upper base unit 200 is slidably adjustable with respect to the lower base unit 100 for various heights.

The support beam vertical support 220 includes a plurality of support beam vertical support apertures 226 formed therethrough. In various exemplary embodiments, a longitudinal axis of each support beam vertical support aperture 226 is perpendicular to a longitudinal axis of the support beam vertical support 220. The support beam vertical support apertures 226 allow the center-point adjustable sleeve assembly 300 to be adjustably positioned along the hitch beam vertical support 120, at a desired position, as described below.

In various exemplary embodiments, the second end 224 of the support beam vertical support 220 is permanently attached or coupled to the support beam 210 at a location between the first end 212 and the second end 214, such that a longitudinal axis of the support beam 210 is substantially perpendicular to a longitudinal axis of the support beam vertical support 220. In various exemplary embodiments, a second end 224 of the support beam vertical support 220 is permanently attached or coupled at a location proximate the second end 214 of the support beam 210. Typically, the support beam vertical support 220 is attached or coupled to the support beam 210 by welding. However, it should be appreciated that the support beam vertical support 220 may be permanently or removably attached or coupled to the support beam 210 by any desired method or device, such as, for example, by fasteners.

In certain exemplary, nonlimiting embodiments, a support beam reinforcing corner 230 is attached or coupled so as to join at least a portion of the support beam 210 to the support beam vertical support 220 in order to provide additional rigidity to the attached or coupled support beam 210 and the support beam vertical support 220. However, it should be appreciated that the support beam reinforcing corner 230 may be permanently or removably attached or coupled to so as to join at least a portion of the support beam 210 to the support beam vertical support 220 by any desired method or device, such as, for example, by fasteners.

Loops 240 are permanently or removably attached or coupled to opposing right and left sides of the support beam vertical support 220, proximate the second end 224. The loops 240 provide attachment points for the support straps 700.

Once assembled, the upper base unit 200 serves as a horizontal support frame for the rack system 500.

As illustrated most clearly in FIGS. 12-17, the center-point adjustable sleeve assembly 300 includes a sleeve element 310, an adjustment plate 330, and a handle 340. The sleeve element 310 comprises an elongate portion of material extending from a first end to a second end. Typically, the sleeve element 310 comprises a portion of square, tubular material sized so as to receive at least a portion of the hitch beam vertical support 120 within the sleeve element 310. In this manner, the sleeve element 310 is slidable along at least a portion of the hitch beam vertical support 120.

A plurality of sleeve element apertures 316 are formed through the sleeve element 310 so as to be aligned with the hitch beam vertical support apertures 126 and the support beam vertical support apertures 226. The plurality of sleeve element apertures 316 allows the position of the sleeve element 310 to be adjusted in relation to the hitch beam vertical support 120 and the support beam vertical support 220 and maintained in a desired position when one or more pins or bolts 600 is positioned through aligned, corresponding sleeve element apertures 316, hitch beam vertical support apertures 126, and support beam vertical support apertures 226.

In various exemplary embodiments, the adjustment plate 330 is permanently attached or coupled to the sleeve element 310 at a location between the first end and the second end. Typically, the adjustment plate 330 is attached or coupled to the sleeve element 310 by welding. However, it should be appreciated that the adjustment plate 330 may be permanently or removably attached or coupled to the sleeve element 310 by any desired method or device, such as, for example, by fasteners.

The adjustment plate 330 includes a first adjustment plate aperture 335 formed through the adjustment plate 330 proximate the first end and a second adjustment plate aperture 335 formed through the adjustment plate 330 proximate the second end.

In certain exemplary, nonlimiting embodiments, the handle 340 is permanently attached or coupled, such as by welding, to the sleeve element 310 at a location between the first end and the second end.

As illustrated most clearly in FIGS. 18-22, the crossbar assemblies 400 includes a crossbar sleeve element 420, a crossbar 410, and a crossbar end plate 430. The crossbar sleeve element 420 comprises an elongate portion of material extending from a first end to a second end. Typically, the crossbar sleeve element 420 comprises a portion of square, tubular material sized so as to receive at least a portion of the support beam 210 within the crossbar sleeve element 420. In this manner, the crossbar sleeve element 420 is slidable along at least a portion of the support beam 210. A plurality of crossbar sleeve element apertures 426 are formed through the crossbar sleeve element 420 so as to be aligned with the support beam apertures 216. The plurality of crossbar sleeve element apertures 426 allows the position of the crossbar sleeve element 420 to be adjusted in relation to the support beam 210 and maintained in a desired position when one or more pins or bolts 600 is positioned through aligned, corresponding crossbar sleeve element apertures 426 and support beam apertures 216.

The crossbar 410 comprises an elongate portion of material and is permanently attached or coupled, such as by welding, to the crossbar sleeve element 420 at a location proximate the center of the crossbar 410. A longitudinal axis of the crossbar sleeve element 420 is perpendicular to a longitudinal axis of the crossbar 410. However, it should be appreciated that each crossbar 410 may be permanently or removably attached or coupled to crossbar sleeve element 420 by any desired method or device, such as, for example, by fasteners.

In various exemplary embodiments, a crossbar end plate 430 is permanently attached or coupled to each end of the crossbar 410. In various exemplary embodiments, each crossbar end plate 430 is permanently attached or coupled to the crossbar 410, such as by welding. However, it should be appreciated that each crossbar end plate 430 may be permanently or removably attached or coupled to the crossbar 410 by any desired method or device, such as, for example, by fasteners.

Each crossbar end plate 430 includes at least one crossbar plate aperture 436 formed therethrough.

In various exemplary embodiments, certain components of the rack system 500 are substantially rigid and are formed of steel. Alternate materials of construction of the various components of the rack system 500 may include one or more of the following: stainless steel, aluminum, titanium, and/or other metals, various alloys and composites thereof, and/or various combinations of the foregoing. Thus, it should be understood that the material or materials used to form the various components of the rack system 500 is a design choice based on the desired appearance and functionality of the rack system 500.

It should be appreciated that certain elements of the rack system 500 may be formed as an integral unit (such as, for example, the hitch beam 110 and the hitch beam vertical support 120 and the support beam 210 and the support beam vertical support 220). Alternatively, suitable materials can be used and sections or elements made independently and attached or coupled together, such as by adhesives, welding, screws, rivets, pins, or other fasteners, to form the various elements of the rack system 500.

It should also be understood that the overall size and shape of the rack system 500, and the various portions thereof, is a design choice based upon the desired functionality and/or appearance of the rack system 500.

The rack system 500 also includes a set of support straps 700 that can be attached to the loops 240 to limit movement of the horizontal and vertical frames when attached to the vehicle. A hitch connection is provided at the lower end of the lower base unit 100. The lower base unit 100 serves as the vertical support frame for the upper base unit 200. The upper base unit 200 is cantilevered over the vehicle 800 to provide an elevated rack system above the roof of the vehicle 800.

During installation and use, as illustrated most clearly in FIGS. 23-29, the lower base unit 100 is assembled. First, the center-post adjustment sleeve assembly 300 is slid over the hitch beam vertical support 120 so that the handle 340 faces rearward (the opposite side of where the lower base unit 100 is attached to the trailer hitch 810 of the vehicle 800). A hitch pin, such as, for example, a ⅝ inch diameter each pin, is temporarily placed within the hitch pin holder 118 of the lower base unit 100.

Next, the first end 112 of the hitch beam 100 and is inserted into the vehicle tow hitch receiver tube 810. The lower base unit 100 is urged forward into position so that the hitch beam vertical support 120 is in contact with the spare tire 820 (if included). Once positioned, the hitch pin hole of the tow hitch receiver tube 810 is aligned with the appropriate hitch beam aperture 116 and the hitch pin is removed from the hitch pin holder 118 and inserted through the trailer hitch 810 to secure the lower base unit 100 to the trailer hitch 810.

Next, the center-point adjustable sleeve assembly 300 is positioned about the hitch beam vertical support 120 and aligned with spare tire 820 in a manner that will facilitate the strap entry through the wheel of the spare tire 810. One or more pins or bolts 600 (such as, for example, to ⅜ inch diameter by 2¾ inch length bolts) are used to secure the center-point adjustable sleeve assembly 300 to the hitch beam vertical support 120, via alignment and interaction of the hitch beam vertical support apertures 126 and the sleeve element apertures 316.

Then, a cam strap (not shown) is inserted through an adjustment plate aperture 335 and the cam strap is pulled until the cam strap buckle pad prevents any further movement of the cam strap. The cam strap is then inserted through a first opening in the wheel of the spare tire 820 and back out through a second opening in the wheel of the spare tire 820 and through the adjustment plate aperture 335. The cam strap is then positioned through the cam strap buckle and pulled tight. By utilizing the cam strap in conjunction with the adjustment plate aperture(s) 335, the amount of forward and aft movement of the rack system 500 is limited.

Once the lower base unit 100 has been assembled, the upper base unit 200 is assembled. The upper base unit 200 is assembled by attaching one or more crossbars 410 to the support beam 210 by sliding the crossbar sleeve element 240 into a desired position along the support beam 210. One or more pins or bolts 600 (such as, for example, to ⅜ inch diameter by 2½ inch length bolts) are used to secure each crossbar sleeve element 420 to the support beam 210. It should be appreciated that while the rack system 500 is shown and described as including to crossbars 410 position along the support beam 210, the number and placement of crossbars 410 is a design choice based upon the desired functionality of the rack system 500.

Once the desired number of crossbars 410 are positioned along the upper base unit 200, the support beam vertical support 220 of the upper base unit 200 is at least partially inserted within the hitch beam vertical support 120. The support beam vertical support 220 is inserted within the hitch beam vertical support 120, such that the support beam 210 is approximately 2" above the roofline of the vehicle 800.

In various exemplary embodiments, the support beam vertical support 220 is secured in place relative to the hitch beam vertical support 120 using one or more pins or bolts 600 (such as, for example, to ⅜ inch diameter by 2½ inch length bolts). A first pin or bolt 600 may be placed through a hitch beam vertical support aperture 126 at the top of the hitch beam vertical support 120 where the support beam vertical support 220 enters the hitch beam vertical support 120, while a second pin or bolt 600 may be placed through a lower hitch beam vertical support aperture 126, for a more stable connection.

Once the rack system 500 is installed on the vehicle 800, the support straps 700 can be attached to the loops 240 by use of an "S" hook or similar device at the ends of a strap 700. This can be accomplished by inserting an "S" hook at the cam buckle end of a strap 700 into the loop 240 on each side of the upper base unit 200. Then, the "S" hook of the running end of each strap 700 is inserted into an attaching point under the rear bumper (the bumper braces on each side) of the vehicle 800. Next, the running end of the strap 700 is slid into the cam buckle and pull tightly. An appropriate amount of attention is placed on each side of the rack system 500 so that the rack system 500 is straight and level (not leaning to one side).

It should be appreciated that the rack system 500 can be removed from the vehicle 800 by performing the steps in reverse.

Figure 30:
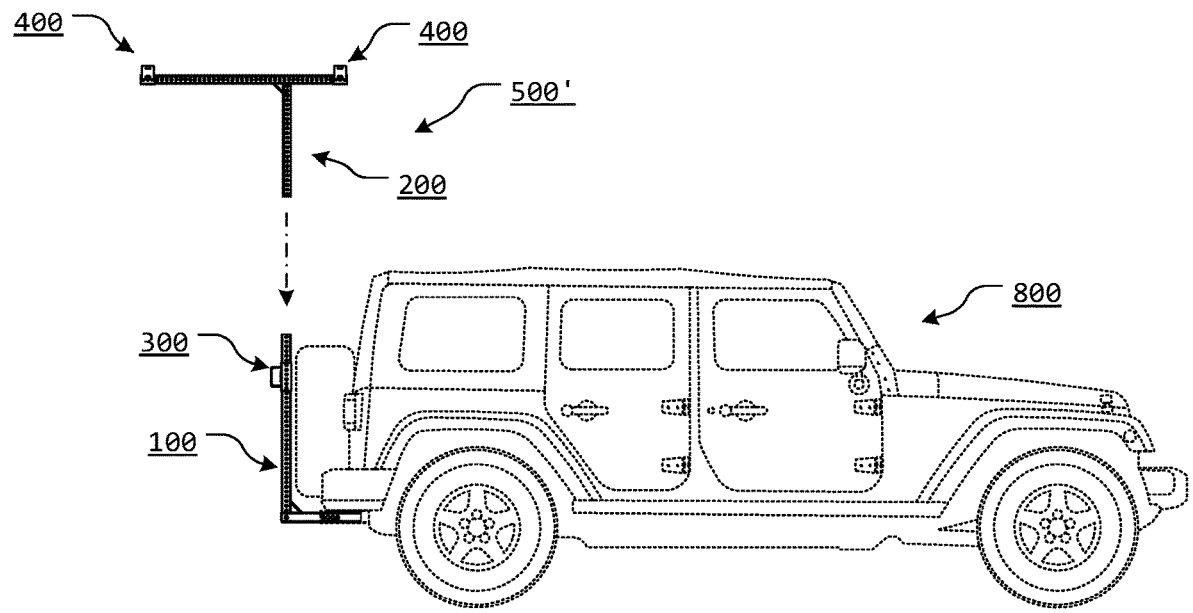
FIG. 30 illustrates a side view of the rack system of an exemplary embodiment of the hitch mounted accessory rack system being installed on an exemplary vehicle in accordance with an alternate installation embodiment, according to this disclosure.
Figure 31:
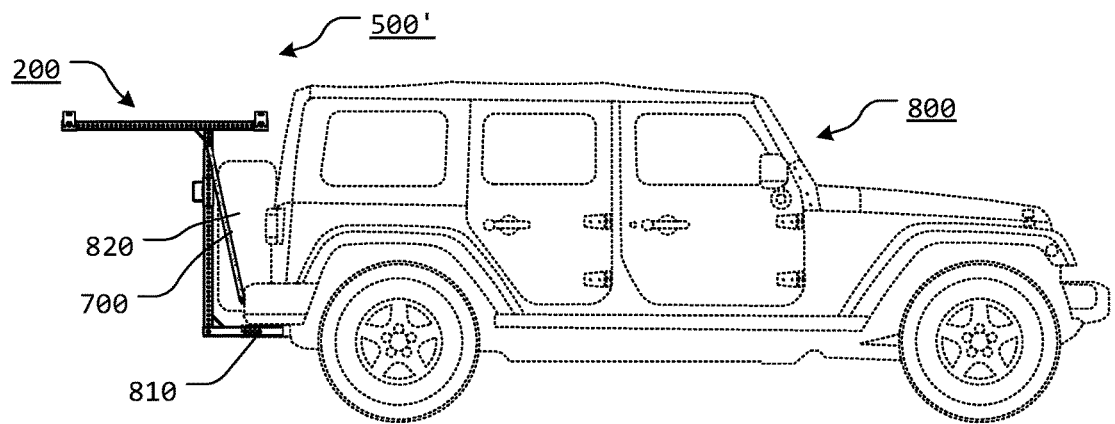
FIG. 31 illustrates a side view of the rack system of an exemplary embodiment of the hitch mounted accessory rack system installed on an exemplary vehicle in accordance with an alternate installation embodiment, according to this disclosure.

FIGS. 30-31 illustrate an exemplary configuration of the hitch mounted accessory rack system, according to this disclosure. As illustrated in FIGS. 30-31, the rack system 500' comprises the lower base unit 100, the upper base unit 200, the center-point adjustable sleeve assembly 300, the crossbar assemblies 400, and the support straps 700.

However, as further illustrated in FIGS. 30-31, the upper base unit 200 is inserted into the lower base unit 100 such that the cantilever of the upper base unit 200 is facing rearward (instead of over the roofline of the vehicle 800) and lowered to a position just above the spare tire 820. This configuration allows for various gear baskets or other items to be added and be accessible to the driver.

Figure 37:
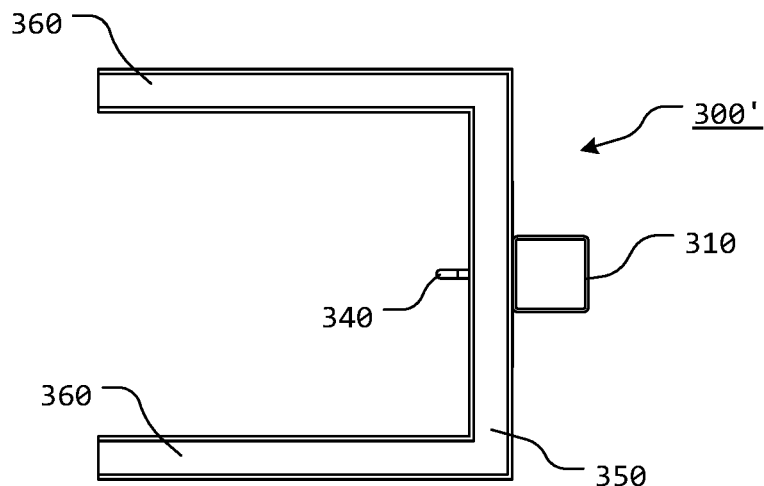
FIG. 37 illustrates a top view of an exemplary embodiment of a hitch mount sleeve assembly of a hitch mounted accessory rack system, according to this disclosure.
Figure 38:
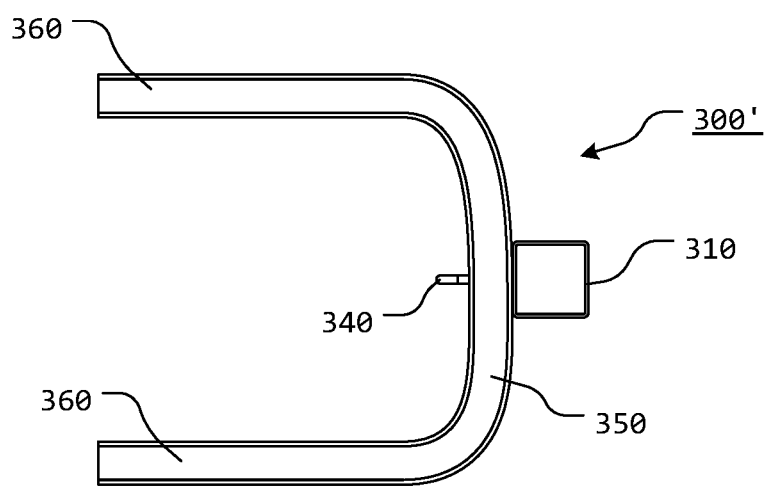
FIG. 38 illustrates a top view of an exemplary embodiment of a hitch mount sleeve assembly of a hitch mounted accessory rack system, according to this disclosure.
Figure 39:
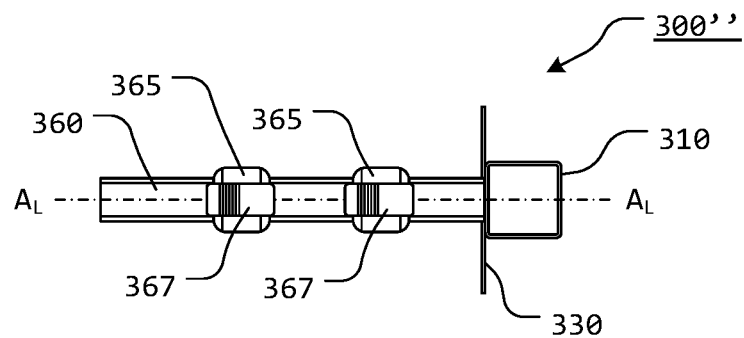
FIG. 39 illustrates a top view of an exemplary embodiment of a hitch mount sleeve assembly of a hitch mounted accessory rack system, according to this disclosure.
Figure 40:
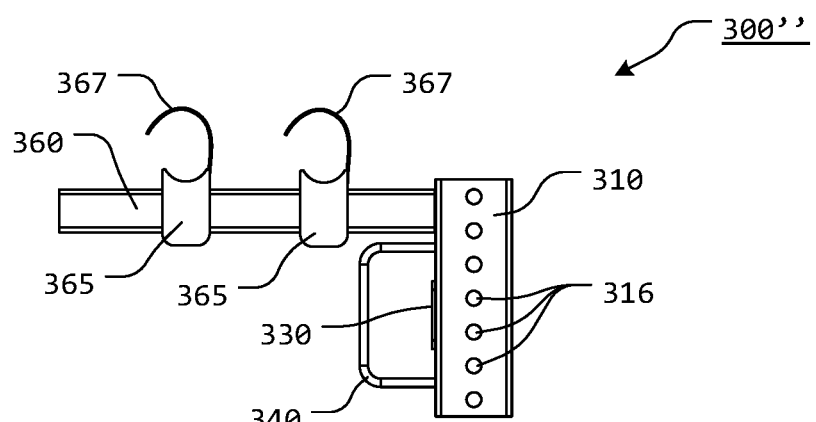
FIG. 40 illustrates a side view of an exemplary embodiment of a hitch mount sleeve assembly of a hitch mounted accessory rack system, according to this disclosure.
Figure 41:
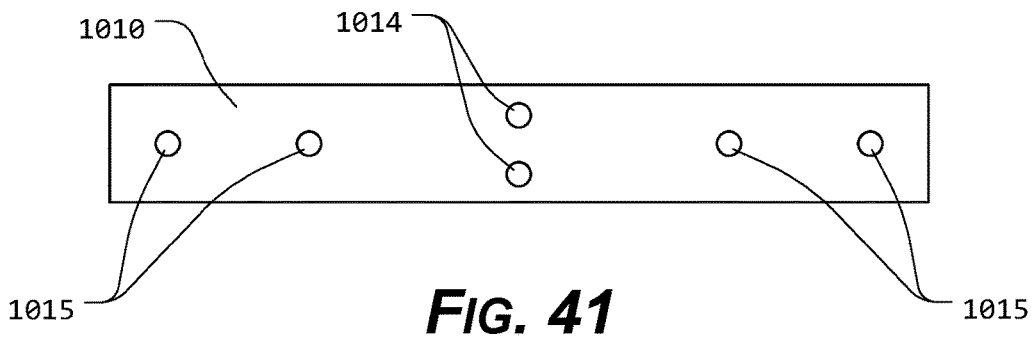
FIG. 41 illustrates a front view of an exemplary embodiment of a stabilizer plate of an accessory rack brace system, according to this disclosure.
Figure 42:
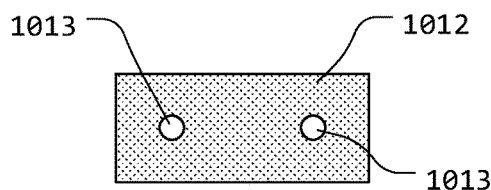
FIG. 42 illustrates a rear view of an exemplary embodiment of a bumper element of an accessory rack brace system, according to this disclosure.
Figure 43:
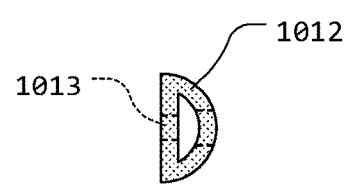
FIG. 43 illustrates a side view of an exemplary embodiment of a bumper element of an accessory rack brace system, according to this disclosure.
Figure 44:
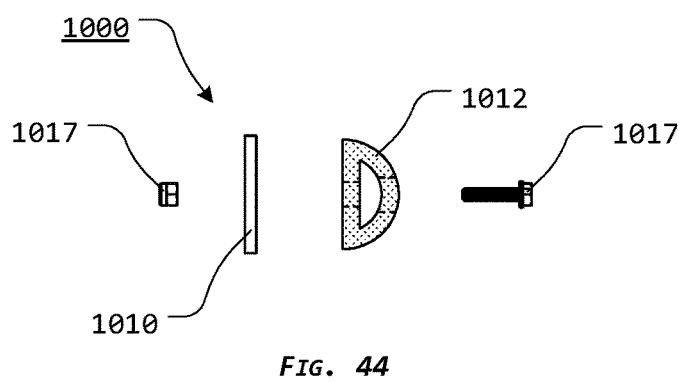
FIG. 44 illustrates a side view of various exemplary components of an exemplary embodiment of an accessory rack brace of an accessory rack brace system, according to this disclosure.
Figure 45:
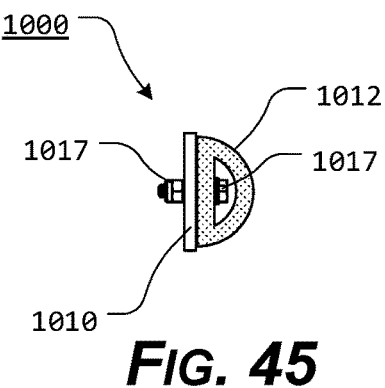
FIG. 45 illustrates a side view of an exemplary embodiment of an accessory rack brace of an accessory rack brace system, according to this disclosure.
Figure 46:
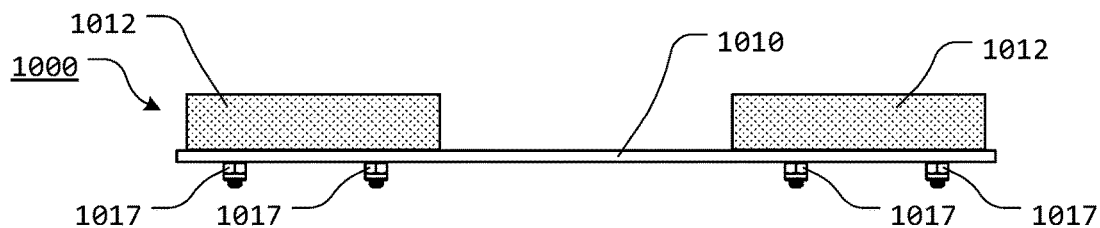
FIG. 46 illustrates a side view of an exemplary embodiment of an accessory rack brace of an accessory rack brace system, according to this disclosure.
Figure 47:
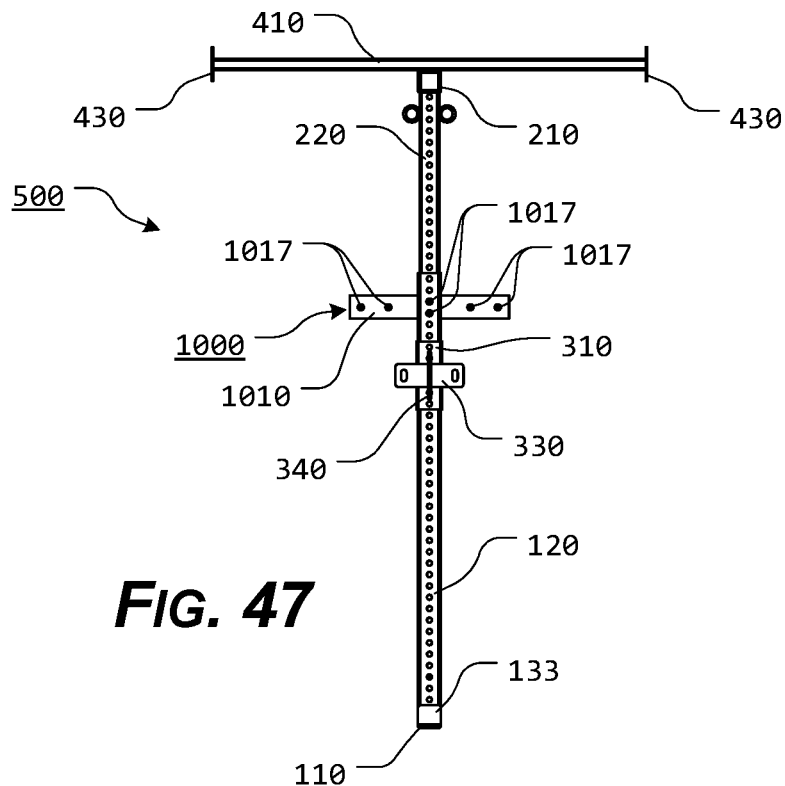
FIG. 47 illustrates a rear view of an exemplary embodiment of a rack system utilizing an exemplary embodiment of an accessory rack brace system, according to this disclosure.

FIGS. 32-38 illustrate exemplary configurations of a center-point adjustable sleeve assembly 300', while FIGS. 39-40 illustrate exemplary configurations of a center-point adjustable sleeve assembly 300", according to this disclosure. As illustrated in FIGS. 32-38, the adjustable sleeve assembly 300' comprises a sleeve element 310 having a plurality of sleeve element apertures 316, an adjustment plate 330 having a first adjustment plate aperture 335 and a second adjustment plate aperture 335, and a handle 340.

It should be understood that each of these elements of the adjustable sleeve assembly 300', as shown in FIGS. 32-38, correspond to and operate similarly to the elements of center-point adjustable sleeve assembly 300, as described above with reference to FIGS. 12-17.

However, as illustrated in FIGS. 32-38, the sleeve element 310 may optionally be longer than the sleeve element 310 of the center-point adjustable sleeve assembly 300, in order to provide additional space on the sleeve element 310 for an arm beam 350. In addition, the arm beam 350 is permanently attached or coupled to the sleeve element 310 at a location between the first end and the second end. Generally, the arm beam 350 is attached or coupled to the sleeve element 310, such that the longitudinal axis of the arm beam 350 is substantially perpendicular to the longitudinal axis of the sleeve element 310.

Typically, the arm beam 350 is attached or coupled to the sleeve element 310 by welding. However, it should be appreciated that the arm beam 350 may be permanently or removably attached or coupled to the sleeve element 310 by any desired method or device, such as, for example, by fasteners.

The arm beam 350 comprises an elongate portion of tubular or at least partially tubular material extending from a first end to a second end. In various exemplary embodiments, the arm beam 350 comprises a portion of substantially round, oval, square, or rectangular tubular material. Alternatively, the arm beam 350 may optionally comprise a portion of solid material. In various exemplary embodiments, the exterior dimension of the arm beam 350 may optionally be 2 inches. Alternatively, the exterior dimension of the arm beam 350 may optionally be 1¼ inch to 2½ inches.

However, it should be appreciated that the overall shape and/or configuration of the arm beam 350 is a design choice based upon the desired strength, functionality, and/or appearance of the arm beam 350.

An accessory arm 360 extends from each end or end portion of the arm beam 350. Each accessory arm 360 comprises an elongate portion of tubular or at least partially tubular material extending from a first end to a second end. In various exemplary embodiments, each accessory arm 360 comprises a portion of substantially round, oval, square, or rectangular tubular material. Alternatively, each accessory arm 360 may optionally comprise a portion of solid material. In various exemplary embodiments, the exterior dimension of each accessory arm 360 may optionally be 2 inches. Alternatively, the exterior dimension of each accessory arm 360 may optionally be 1¼ inch to 2½ inches.

However, it should be appreciated that the overall shape and/or configuration of each accessory arm 360 is a design choice based upon the desired strength, functionality, and/or appearance of each accessory arm 360.

In certain exemplary embodiments, the arms 360 extend from the arm beam 350, such that the longitudinal axes, $A_L$, of the arms 360 are each substantially parallel to one another, forming a substantially "U" shape. In certain other exemplary embodiments, the longitudinal axes, $A_L$, of the arms 360 are at angles that are substantially acute to one another, forming a substantially "V" shape. In still other exemplary embodiments, the longitudinal axes, $A_L$, of the arms 360 are at angles that are substantially obtuse to one another, forming a substantially reverse "V" shape.

In certain exemplary embodiments, each accessory arm 360 is a separate component or element that is attached or coupled to the arm beam 350 by, for example, welding. However, it should be appreciated that each accessory arm 360 may be permanently or removably attached or coupled to the arm beam 350 by any desired method or device, such as, for example, by adhesives, welding, screws, rivets, pins, or other fasteners.

In certain exemplary embodiments, as illustrated in FIGS. 37 and 38, the arm beam 350 and accessory arms 360 may be formed as an integral or at least partially integral unit.

It should be appreciated that the length of the arm beam 350 and each of the arms 360 is optional. In addition, the positioning of each arm 360 relative to the arm beam 350 is optional. Thus, it should be appreciated that the length of each arm 360 and the distance between each arm 360 is a design choice and may be varied, based upon the desired functionality and/or intended use of the arms 360 and/or the adjustable sleeve assembly 300'.

The accessory arms 360 extend from the sleeve element 310 and, when assembled as a component of an exemplary rack system 500, extent to provide a hitch mounted accessory rack system that allows items, such as, for example, one or more transport boxes, baskets, cages, carriers, bicycles, or other items to be supported by, suspended from, or attached or coupled to one or more of the accessory arms 360.

Figure 32:
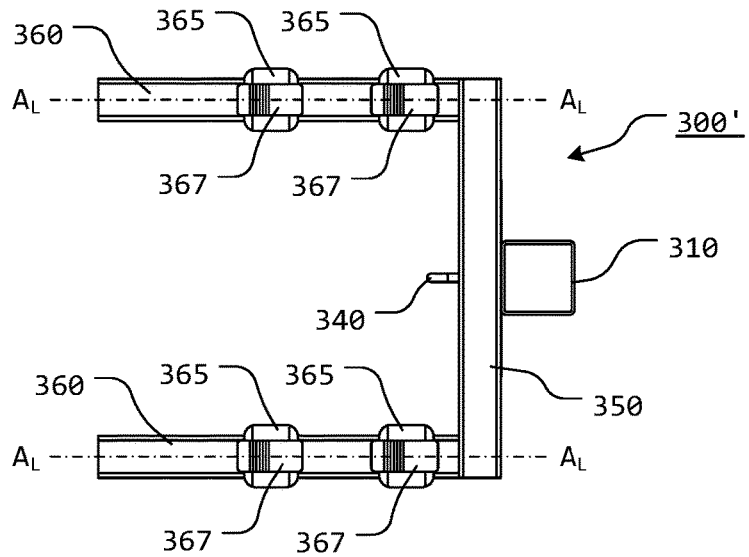
FIG. 32 illustrates a top view of an exemplary embodiment of a hitch mount sleeve assembly of a hitch mounted accessory rack system, according to this disclosure.
Figure 33:
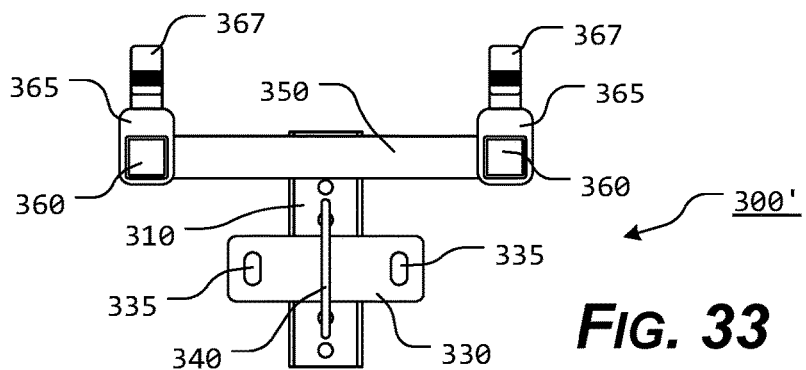
FIG. 33 illustrates a rear view of an exemplary embodiment of a hitch mount sleeve assembly of a hitch mounted accessory rack system, according to this disclosure.
Figure 34:
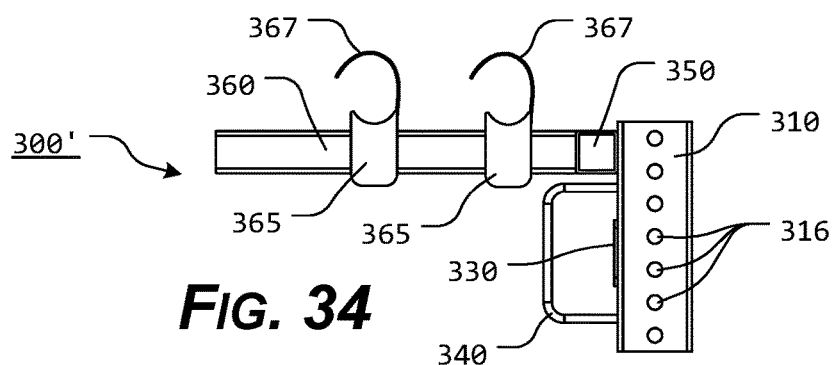
FIG. 34 illustrates a side view of an exemplary embodiment of a hitch mount sleeve assembly of a hitch mounted accessory rack system, according to this disclosure.

As illustrated in FIGS. 32-34, certain optional holding or attachment elements, such as, for example, exemplary assemblies that optionally include one or more cradles 365 and/or one or more straps 367 may be included as part of the arms 360. In certain exemplary embodiments, the cradles 365 and/or straps 367 comprise or are similar to known cradles and/or straps utilized to secure articles, such as, for example, bicycles, to a vehicle mounted bicycle rack or carrier. In certain exemplary embodiments, the one or more cradles 365 and/or one or more straps 367 may optionally comprise separate elements that are attached or coupled to the arms 360. Alternatively, the one or more optional cradles 365 may optionally comprise protrusions, recesses, or other surface preparations that are formed as an integral component of the arms 360. Similarly, the one or more optional straps 367 may be attached or coupled directly to the arms 360 instead of being attached or coupled to the one or more cradles 365.

Figure 35:
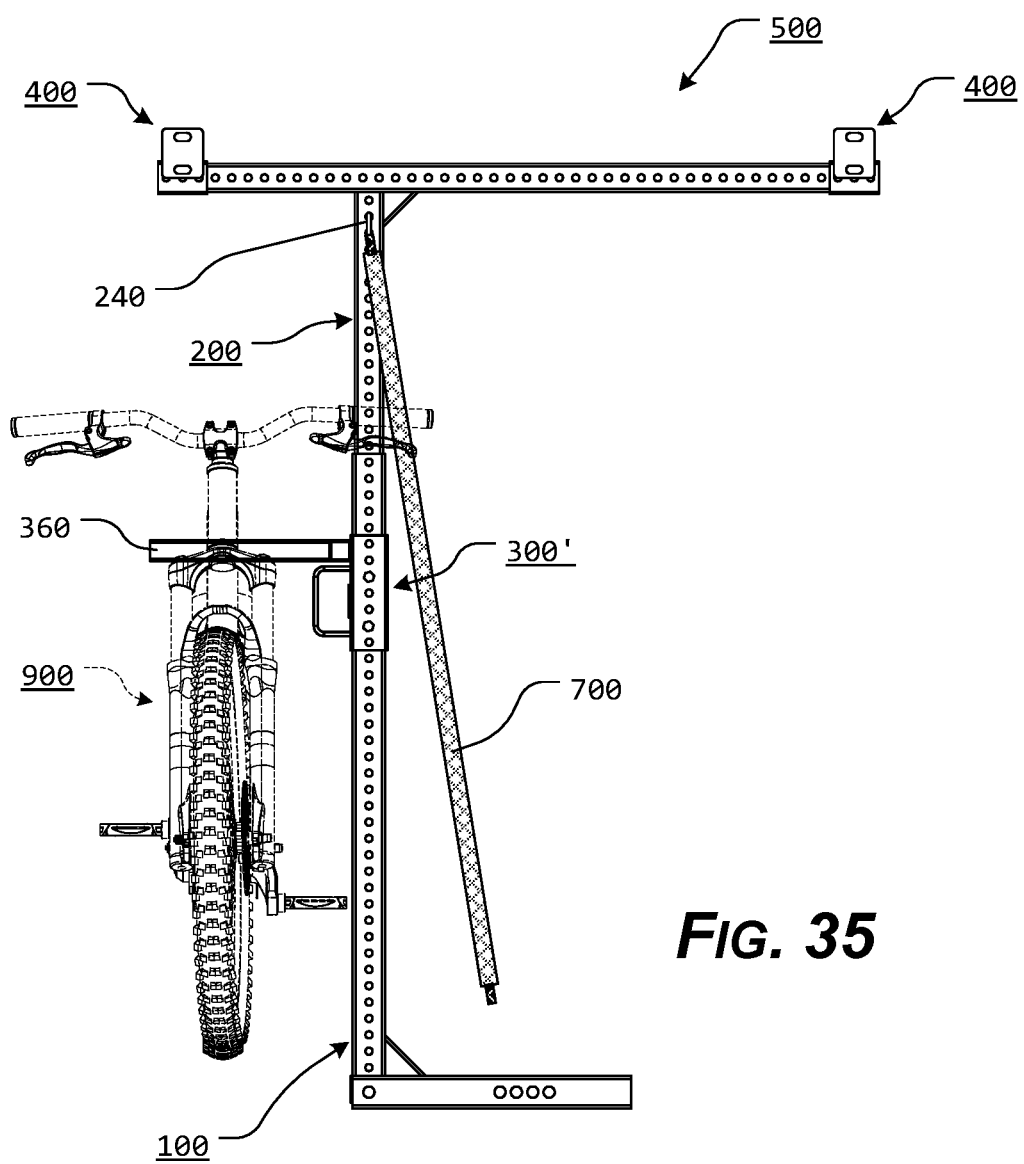
FIG. 35 illustrates a side view of an exemplary embodiment of a hitch mount sleeve assembly assembles as part of a hitch mounted accessory rack system, according to this disclosure.
Figure 36:
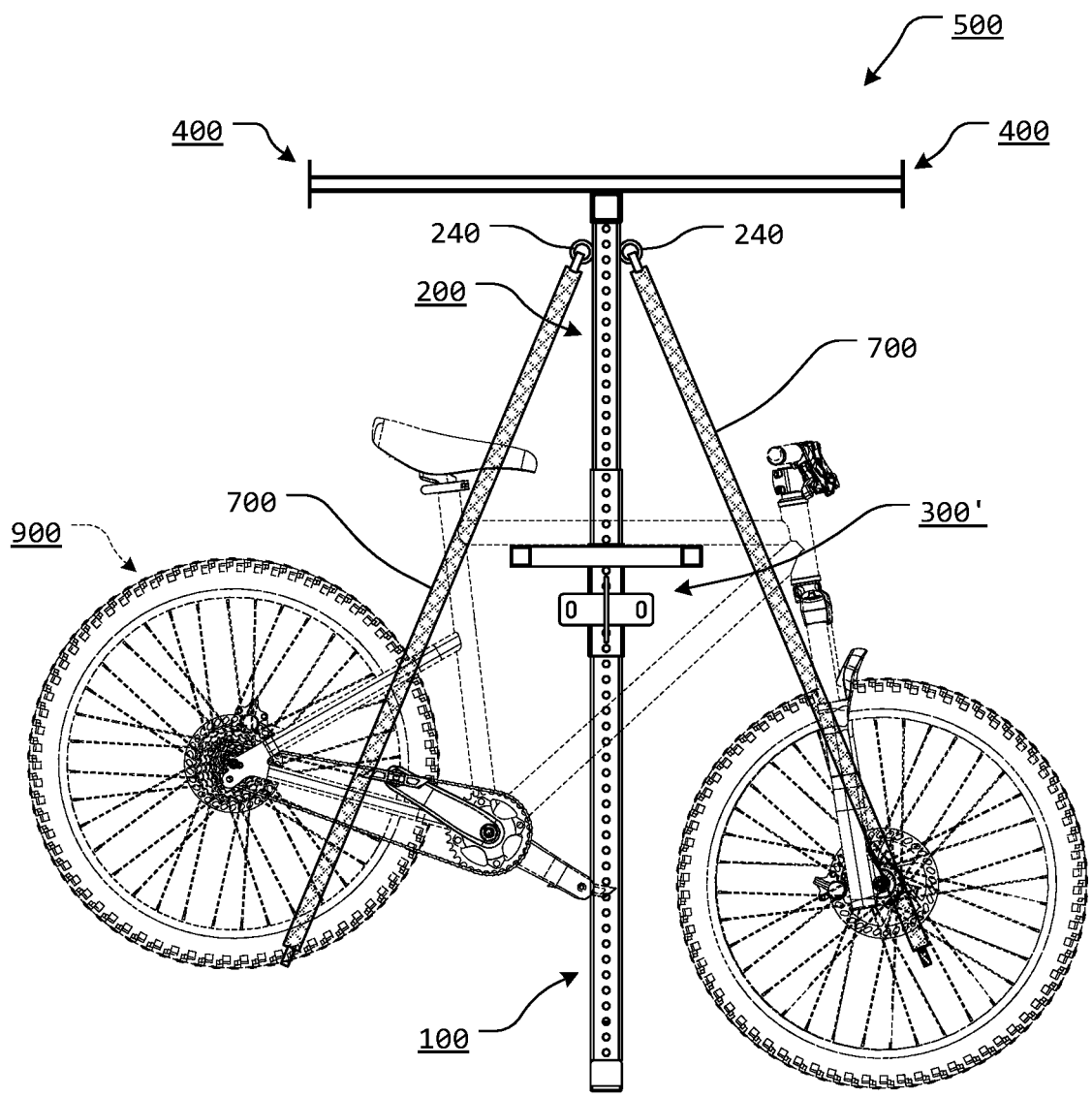
FIG. 36 illustrates a rear view of an exemplary embodiment of a hitch mount sleeve assembly assembles as part of a hitch mounted accessory rack system, according to this disclosure.

As illustrated in FIGS. 35-36, the adjustable sleeve assembly 300' is assembled as a component of an exemplary rack system 500. An exemplary bicycle 900, as illustrated in dashed or broken lines, is supported by the arms 360.

As illustrated in FIGS. 39-40, the adjustable sleeve assembly 300" comprises a sleeve element 310 having a plurality of sleeve element apertures 316, an adjustment plate 330 having a first adjustment plate aperture 335 and a second adjustment plate aperture 335, and a handle 340.

It should be understood that each of these elements of the adjustable sleeve assembly 300", as shown in FIGS. 39-40, correspond to and operate similarly to the elements of center-point adjustable sleeve assembly 300, as described above with reference to FIGS. 12-17.

However, as illustrated in FIGS. 39-40, the sleeve element 310 may optionally be longer than the sleeve element 310 of the center-point adjustable sleeve assembly 300, in order to provide additional space on the sleeve element 310 for an accessory arm 360. The accessory arm 360 is permanently attached or coupled to the sleeve element 310 at a location between the first end and the second end. Generally, the accessory arm 360 is attached or coupled to the sleeve element 310, such that the arm 360 extends from the sleeve element 310 and the longitudinal axis of the accessory arm 360 is substantially perpendicular to the longitudinal axis of the sleeve element 310. However, in various exemplary embodiments, the accessory arm 360 may optionally extend from the sleeve element 310 such that the longitudinal axis of the accessory arm 360 is greater than or less than perpendicular to the longitudinal axis of the sleeve element 310. Thus, the accessory arm 360 may optionally extend upward from, perpendicular to, or downward from the sleeve element 310.

Typically, the accessory arm 360 is attached or coupled to the sleeve element 310 by welding. However, it should be appreciated that the accessory arm 360 may be permanently or removably attached or coupled to the sleeve element 310 by any desired method or device, such as, for example, by fasteners.

The accessory arm 360 comprises an elongate portion of tubular or at least partially tubular material extending from a first end to a second end. In various exemplary embodiments, the accessory arm 360 comprises a portion of substantially round, oval, square, or rectangular tubular material. Alternatively, the accessory arm 360 may optionally comprise a portion of solid material. In various exemplary embodiments, the exterior dimension of the accessory arm 360 may optionally be 2 inches. Alternatively, the exterior dimension of the accessory arm 360 may optionally be 1¼ inch to 2½ inches.

However, it should be appreciated that the overall shape and/or configuration of the accessory arm 360 is a design choice based upon the desired strength, functionality, and/or appearance of the accessory arm 360.

FIGS. 41-54 illustrate certain elements and/or aspects of various exemplary embodiments of the accessory rack brace system, according to this disclosure. In illustrative, non-limiting embodiment(s) of this disclosure, as illustrated in FIGS. 41-54, the accessory rack brace 1000 comprises a stabilizer plate 1010 and a bumper element 1012.

As illustrated most clearly in FIGS. 41-48, the stabilizer plate 1010 includes an elongate portion of material. In various exemplary embodiments, the stabilizer plate 1010 is approximately 16 inches long (from a first terminal end to a second terminal end) and approximately 2 and ½ inches tall. In various exemplary embodiments, the stabilizer plate 1010 includes one or more first stabilizer plate apertures 1014 formed proximate a center of the stabilizer plate 1010. The first stabilizer plate apertures 1014 are formed so as to be alignable with apertures of the hitch beam vertical support 120, such that the stabilizer plate 1010 may be attached or coupled, via interaction of one or more portions of a fastener 1017 passing through the aligned first stabilizer plate apertures 1014, to a portion of the hitch beam vertical support 120. In various exemplary embodiments, the first stabilizer plate apertures 1014 are formed of half-inch diameter holes spaced apart from one another by approximately 1 inch on centers.

It should be appreciated that the stabilizer plate 1010 may be permanently or removably attached or coupled to a portion of the hitch beam vertical support 120 by any desired method or device, such as, for example, via interaction of one or more portions of a fastener 1017. However, it should be appreciated that the stabilizer plate 1010 may also be attached or coupled to a portion of the hitch beam vertical support 120 by welding.

In certain alternative embodiments, the stabilizer plate 1010 may optionally be permanently attached or coupled to the sleeve element 310 at a location between the first end and the second end of the sleeve element 310. In these exemplary embodiments, the stabilizer plate 1010 is attached or coupled to the sleeve element 310 by welding. However, it should be appreciated that the stabilizer plate 1010 may be permanently or removably attached or coupled to the sleeve element 310 by any desired method or device, such as, for example, by fasteners.

The stabilizer plate 1010 includes a plurality of second stabilizer plate apertures 1015 formed through the stabilizer plate 1010 proximate a first terminal end portion and a second terminal end portion of the stabilizer plate 1010. In various exemplary embodiments, the second stabilizer plate apertures 1015 are formed of half-inch diameter holes spaced apart from one another by approximately 3 inches on centers. In certain exemplary embodiments, the second stabilizer plate apertures 1015 closest to the first and second terminal ends of the stabilizer plate 1010 are approximately 1 and ⅝ inches from each respective terminal end of the stabilizer plate 1010.

The second stabilizer plate apertures 1015 are formed so as to be aligned with one or more bumper element apertures 1013 of a respective bumper element 1012. In this manner, a bumper element 1012 may be aligned with a portion of the stabilizer plate 1010, such that one or more bumper element apertures 1013 are aligned with one or more second stabilizer plate apertures 1015. Once aligned, one or more portions of a mateable fastener 1017 may be positioned through the aligned bumper element apertures 1013 and second stabilizer plate apertures 1015 so as to attach or couple a respective bumper element 1012 to the stabilizer plate 1010.

In various exemplary embodiments, a portion of a bumper element 1012 may be permanently or removably attached or coupled to a portion of the stabilizer plate 1010 by alternative mating portions of other releasable couplers or releasable fasteners, such as, for example, mating portions of a hook and loop fastener, buttons, snaps, or other fastening, closure, or other releasably mating attachment device is known to those skilled in the art.

In certain illustrative, nonlimiting embodiments, two bumper elements 1012 are attached to the stabilizer plate 1010, at spaced apart locations.

The one or more bumper elements 1012 are attached or coupled to the stabilizer plate 1010 to form the accessory rack brace 1000.

In various exemplary embodiments, each bumper element 1012 comprises or is formed of a resilient portion of material, such as, for example, rubber or silicone. The bumper element 1012 is formed so as to be at least partially resiliently deformable when urged between the stabilizer plate 1010 and another surface.

In various exemplary embodiments, certain components of the accessory rack brace 1000 and/or the stabilizer plate 1010 are substantially rigid and are formed of steel. Alternate materials of construction of the various components of the accessory rack brace 1000 and/or the stabilizer plate 1010 may include one or more of the following: stainless steel, aluminum, titanium, and/or other metals, various alloys and composites thereof, and/or various combinations of the foregoing. Thus, it should be understood that the material or materials used to form the various components of the accessory rack brace 1000 and/or the stabilizer plate 1010 is a design choice based on the desired appearance and functionality of the accessory rack brace 1000 and/or the stabilizer plate 1010.

It should be appreciated that certain elements of the accessory rack brace 1000 and/or the stabilizer plate 1010 may be formed as an integral unit (such as, for example, the accessory rack brace 1000 and the stabilizer plate 1010). Alternatively, suitable materials can be used and sections or elements made independently and attached or coupled together, such as by adhesives, welding, screws, rivets, pins, or other fasteners, to form the various elements of the accessory rack brace 1000 and/or the stabilizer plate 1010.

It should also be understood that the overall size and shape of the accessory rack brace 1000 and/or the stabilizer plate 1010, and the various portions thereof, is a design choice based upon the desired functionality and/or appearance of the accessory rack brace 1000 and/or the stabilizer plate 1010.

As illustrated most clearly in FIGS. 47-48 and 53-54, during use of the accessory rack brace 1000, the accessory rack brace 1000 is attached or coupled to a portion of the rack system 500 (such as, for example, the hitch beam vertical support 120) so as to extend from a portion of the rack system 500 and allow a portion of the bumper element 1012 to be urged against a surface of the vehicle 800, such as, for example, a surface of the vehicle body, a spare tire, or other portion of the vehicle 800.

In this manner, when the rack system 500 is utilized, a degree of resilient tension is created between a portion of the vehicle 800 and the rack system 500, via the accessory rack brace 1000 (and, more specifically, the bumper element(s) 1012), which aids in securing the rack system 500 to the vehicle 800 and aids in dampening any vibration, side to side movement, and/or forward and aft movement of the rack system 500 relative to the vehicle 800.

In various exemplary embodiments, a set of support struts 1700 can optionally be attached or coupled between the stabilizer plate 1010 and the crossbar end plates 430. Each support struts 1700 comprises an elongate support strut body 1710. In certain exemplary embodiments, as illustrated, for example, in FIGS. 49-50, the support strut body 1710 comprises a 1 inch outer diameter tube, approximately 30 inches in length, formed of steel or aluminum. Alternatively, as illustrated, for example, in FIGS. 51-52, the support strut body 1710 may comprise an outer support strut portion 1711 and an inner support strut portion 1712. At least a portion of the inner support strut portion 1712 is slidably positionable within a portion of the outer support strut portion 1711 so as to allow a length of the support strut body 1710 to be adjustable, based on the desired application. In various exemplary embodiments, the inner strut portion 1712 may be lockably positioned relative to the outer support strut portion 1711, so as to maintain a desired overall length of the support strut body 1710.

A first strut tab 1720, having a first strut tab aperture 1725 formed therethrough, is attached to or formed of a portion of a first end portion of the support strut body 1710. Similarly, a second strut tab 1730, having a second strut tab aperture 1735 formed therethrough, is attached to or formed of a portion of a second end portion of the support strut body 1710. It should be appreciated that the first strut tab 1720 and the second strut tab 1730 may be formed of additional portions of material attached or coupled to the support strut body 1710 or may be integrally formed as, for example, flattened portions of the support strut body 1710.

Figure 53:
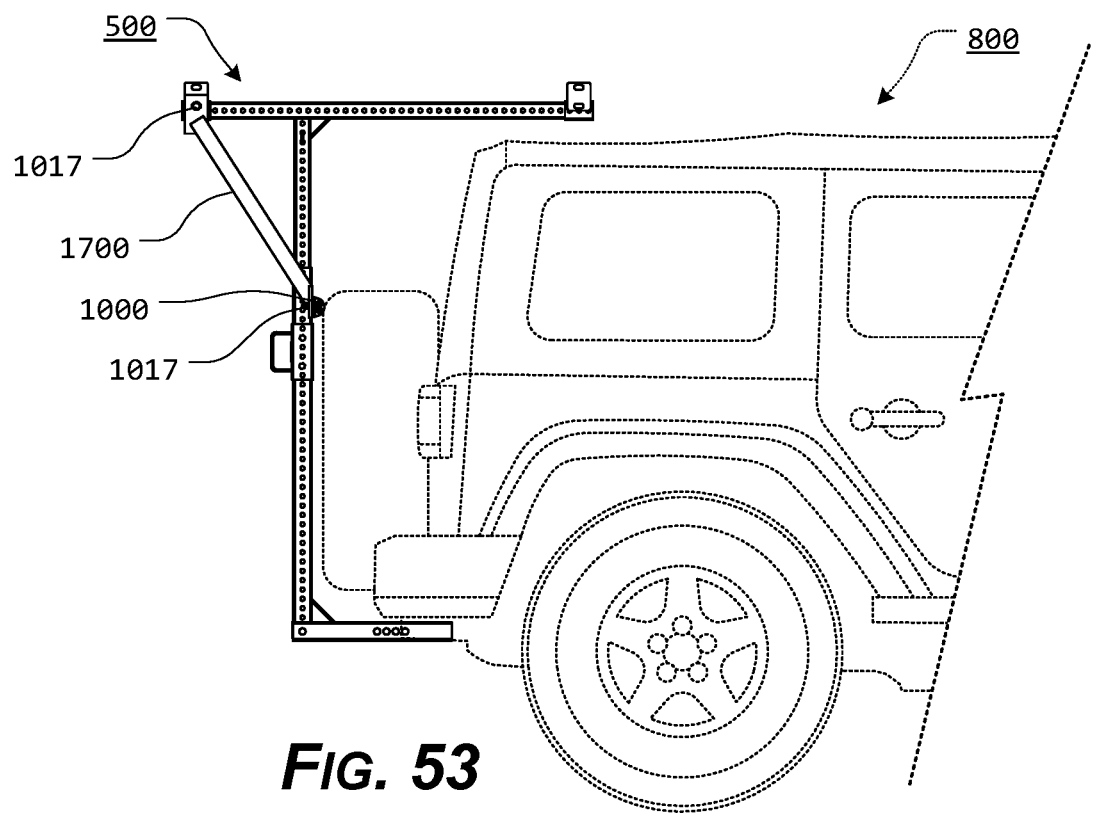
FIG. 53 illustrates a side view of an exemplary embodiment of a hitch mounted accessory rack system and an exemplary accessory rack brace system installed on an exemplary vehicle, according to this disclosure.
Figure 54:
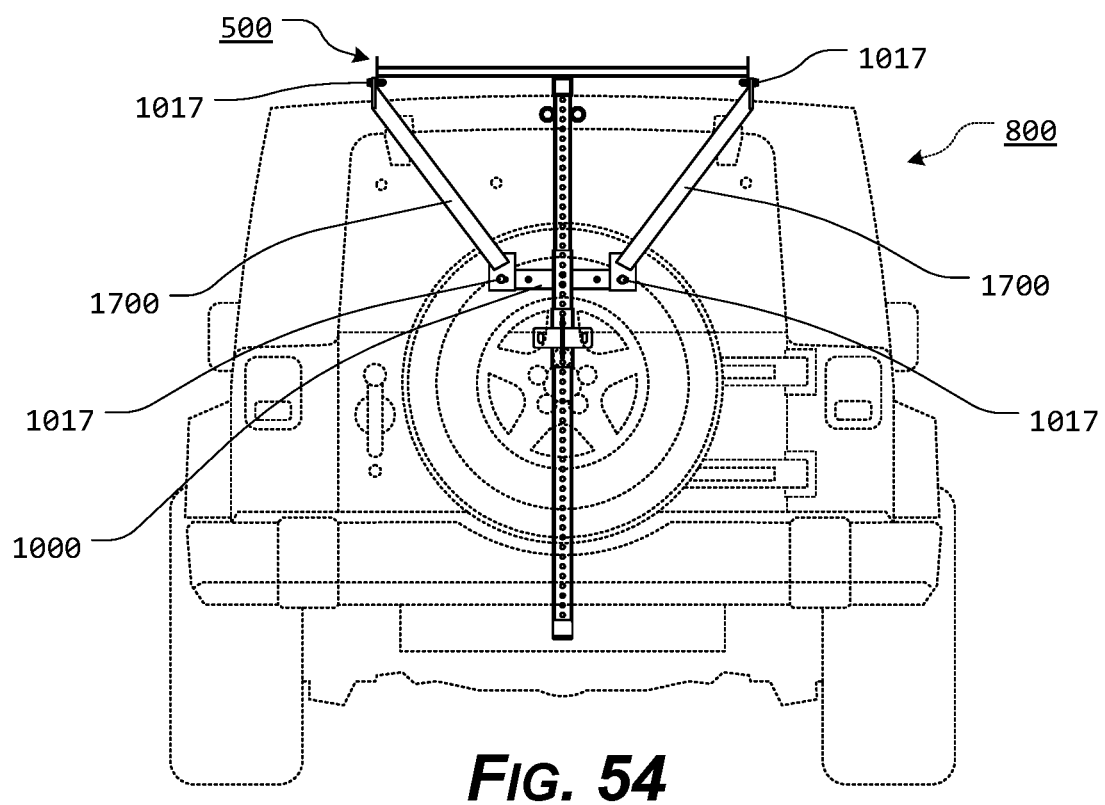
FIG. 54 illustrates a rear view of an exemplary embodiment of a hitch mounted accessory rack system and an exemplary accessory rack brace system installed on an exemplary vehicle, according to this disclosure.

During installation and use of the optional support struts 1700, as illustrated, for example, in FIGS. 53-54, the first strut tab 1720 of each respective support strut 1700 is attached or coupled to a respective crossbar end plate 430. In certain exemplary embodiments, the first strut tab 1720 is attached or coupled via interaction of one or more portions of a fastener 1017 positioned through an aligned first strut tab aperture 1725 and a respective crossbar plate aperture 436.

The second strut tab 1730 of each respective support strut 1700 is attached or coupled to the stabilizer plate 1010. In certain exemplary embodiments, the second strut tab 1730 is attached or coupled via interaction of one or more portions of a fastener 1017 positioned through an aligned second strut tab aperture 1735 and a respective second stabilizer plate aperture 1015.

Utilization of the support struts 1700 provides additional rigidity of the lower base unit 100 relative to the upper base unit 200 and/or at least one of the crossbars 410.

FIGS. 55-63 illustrate certain elements and/or aspects of various exemplary embodiments of the accessory rack brace system, according to this disclosure. In illustrative, non-limiting embodiment(s) of this disclosure, as illustrated in FIGS. 55-63, the brace rack 2000 comprises a stabilizer rack 1800 and at least one stabilizer bracket 1900 and/or accessory rack brace 1000.

Figure 48:
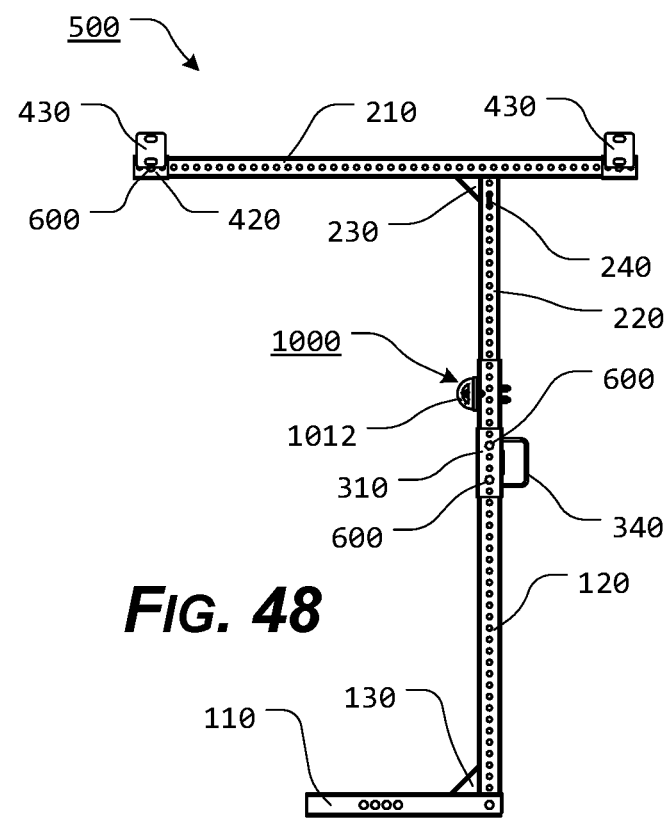
FIG. 48 illustrates a side view of an exemplary embodiment of a rack system utilizing an exemplary embodiment of an accessory rack brace system, according to this disclosure.
Figure 49:
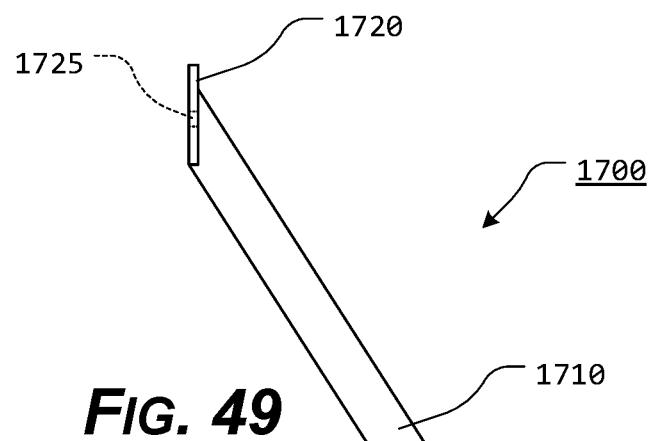
FIG. 49 illustrates a rear view of an exemplary embodiment of a support strut of an accessory rack brace system, according to this disclosure.
Figure 50:
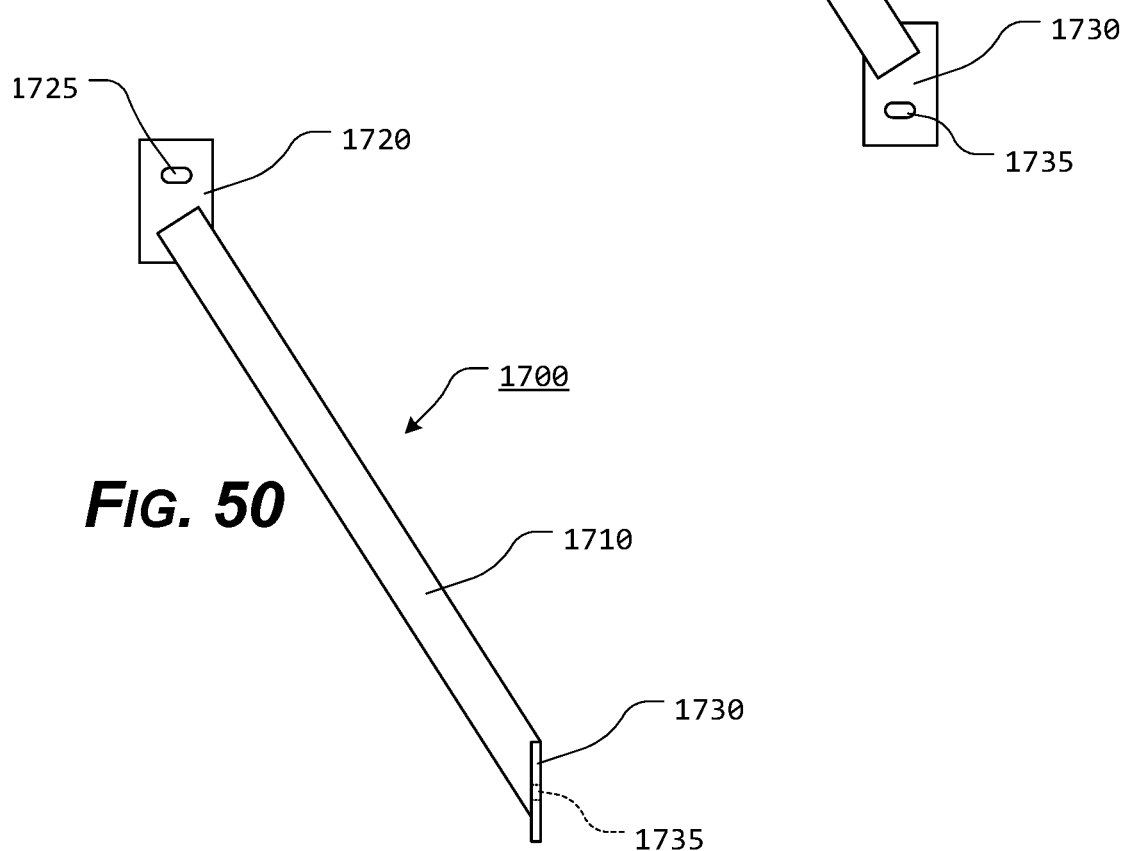
FIG. 50 illustrates a side view of an exemplary embodiment of a support strut of an accessory rack brace system, according to this disclosure.
Figure 51:
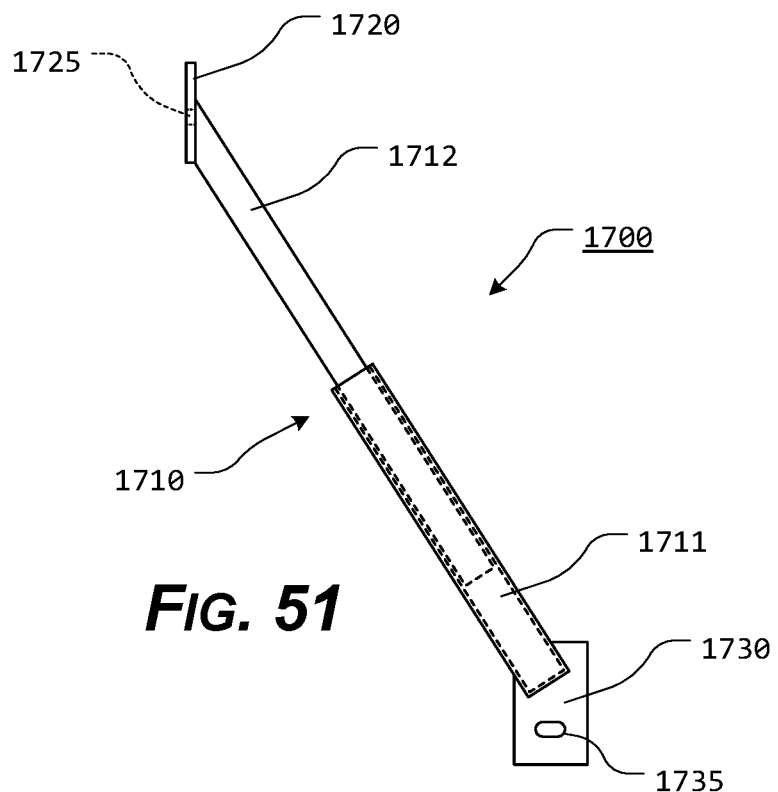
FIG. 51 illustrates a rear view of an exemplary embodiment of a support strut of an accessory rack brace system, according to this disclosure.
Figure 52:
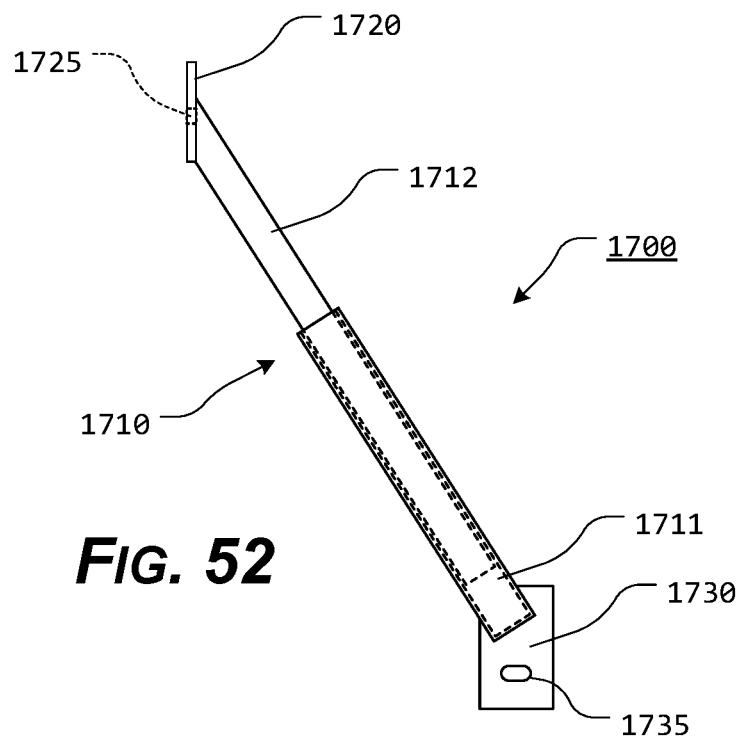
FIG. 52 illustrates a side view of an exemplary embodiment of a support strut of an accessory rack brace system, according to this disclosure.
Figure 55:
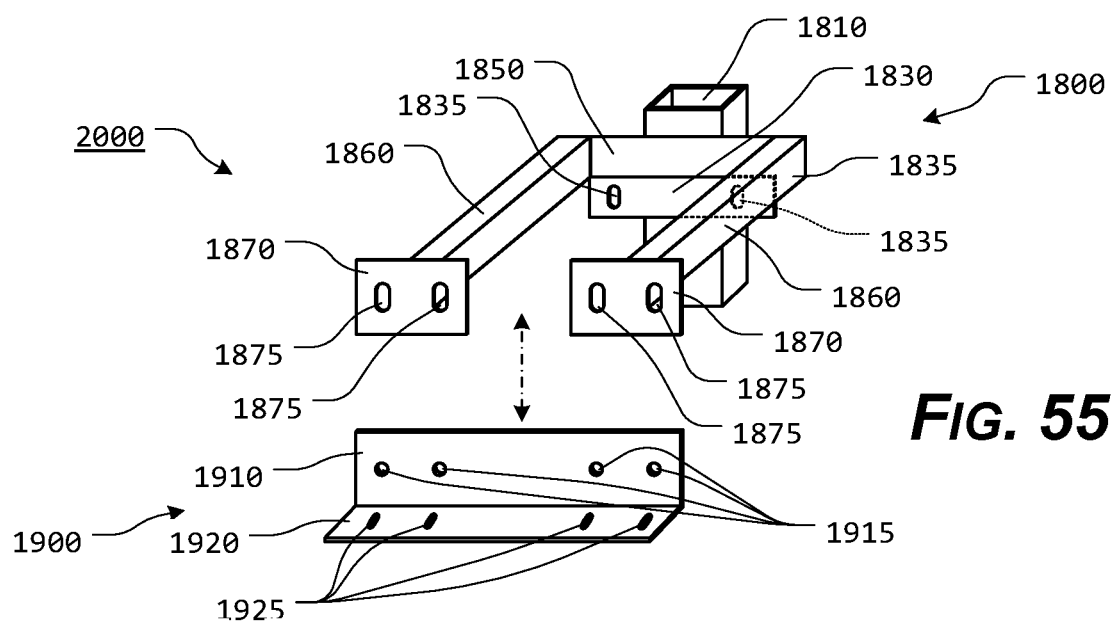
FIG. 55 illustrates a front perspective view of certain exemplary components of an exemplary embodiment of a brace rack of an accessory rack brace system, according to this disclosure.

As illustrated most clearly in FIGS. 55-48, the sleeve element 1810, which substantially corresponds to and operates similarly to the sleeve element 310, includes a rack arm beam 1850, which substantially corresponds to and operates similarly to the arm beam 350. The rack arm beam 1850 is permanently attached or coupled to the sleeve element 1810 at a location between the first end and the second end. Generally, the rack arm beam 1850 is attached or coupled to the sleeve element 1810, such that the longitudinal axis of the rack arm beam 1850 is substantially perpendicular to the longitudinal axis of the sleeve element 1810.

Typically, the rack arm beam 1850 is attached or coupled to the sleeve element 1810 by welding. However, it should be appreciated that the rack arm beam 1850 may be permanently or removably attached or coupled to the sleeve element 1810 by any desired method or device, such as, for example, by fasteners.

The rack arm beam 1850 comprises an elongate portion of tubular or at least partially tubular material extending from a first end to a second end. In various exemplary embodiments, the rack arm beam 1850 comprises a portion of substantially round, oval, square, or rectangular tubular material. Alternatively, the rack arm beam 1850 may optionally comprise a portion of solid material.

It should be appreciated that the overall shape and/or configuration of the rack arm beam 1850 is a design choice based upon the desired strength, functionality, and/or appearance of the rack arm beam 1850.

A rack accessory arm 1860 extends from each end or end portion of the rack arm beam 1850. Each rack accessory arm 1860 comprises an elongate portion of tubular or at least partially tubular material extending from a first end to a second end.

In various exemplary embodiments, each rack accessory arm 1860 comprises a portion of substantially round, oval, square, or rectangular tubular material. Alternatively, each rack accessory arm 1860 may optionally comprise a portion of solid material.

It should be appreciated that the overall shape and/or configuration of each rack accessory arm 1860 is a design choice based upon the desired strength, functionality, and/or appearance of each rack accessory arm 1860.

In certain exemplary embodiments, the rack accessory arms 1860 extend from the rack arm beam 1850, such that the longitudinal axes, $A_L$, of the rack accessory arms 1860 are each substantially parallel to one another, forming a substantially "U" shape. In certain other exemplary embodiments, the longitudinal axes, $A_L$, of the rack accessory arms 1860 are at angles that are substantially acute to one another, forming a substantially "V" shape. In still other exemplary embodiments, the longitudinal axes, $A_L$, of the rack accessory arms 1860 are at angles that are substantially obtuse to one another, forming a substantially reverse "V" shape.

In certain exemplary embodiments, each rack accessory arm 1860 is a separate component or element that is attached or coupled to the rack arm beam 1850 by, for example, welding. However, it should be appreciated that each rack accessory arm 1860 may be permanently or removably attached or coupled to the rack arm beam 1850 by any desired method or device, such as, for example, by adhesives, welding, screws, rivets, pins, or other fasteners.

In certain exemplary embodiments, as illustrated in FIGS. 37 and 38, the rack arm beam 1850 and accessory rack accessory arms 1860 may be formed as an integral or at least partially integral unit.

It should be appreciated that the length of the rack arm beam 1850 and each of the rack accessory arms 1860 is optional. In addition, the positioning of each rack accessory arm 1860 relative to the rack arm beam 1850 is optional. Thus, it should be appreciated that the length of each rack accessory arm 1860 and the distance between each rack accessory arm 1860 is a design choice and may be varied, based upon the desired functionality and/or intended use of the rack accessory arms 1860 and/or the stabilizer rack 1800.

The accessory rack accessory arms 1860 extend from the sleeve element 1810 and, when assembled as a component of an exemplary rack system 500, extends toward a vehicle 800.

An accessory arm end plate 1870 is permanently attached or coupled to each terminal end of each accessory arm 1860. In various exemplary embodiments, each accessory arm end plate 1870 is permanently attached or coupled to the accessory arm 1860, such as by welding. However, it should be appreciated that each accessory arm end plate 1870 may be permanently or removably attached or coupled to the accessory arm 1860 by any desired method or device, such as, for example, by fasteners.

Each accessory arm end plate 1870 includes at least one accessory arm end plate aperture 1875 formed therethrough.

A stabilizer rack plate 1830 is attached or coupled to or extends as an integral portion from a portion of the sleeve element 1810. The stabilizer rack plate 1830 includes an elongate portion of material. In various exemplary embodiments, the stabilizer rack plate 1830 is approximately 16 inches long (from a first terminal end to a second terminal end) and approximately 2 and ½ inches tall.

It should be appreciated that the stabilizer rack plate 1830 may be permanently or removably attached or coupled to a portion of the sleeve element 1810 by any desired method or device, such as, for example, via interaction of one or more portions of a fastener 1017. However, it should be appreciated that the stabilizer rack plate 1830 may also be attached or coupled to a portion of the sleeve element 1810 by welding.

The stabilizer rack plate 1830 includes a plurality of stabilizer plate apertures 1835 formed through the stabilizer rack plate 1830 proximate a first terminal end portion and a second terminal end portion of the stabilizer rack plate 1830. In various exemplary embodiments, the stabilizer plate apertures 1835 are formed of half-inch diameter holes spaced apart from one another by approximately 3 inches on centers. In certain exemplary embodiments, the stabilizer plate apertures 1835 closest to the first and second terminal ends of the stabilizer rack plate 1830 are approximately 1 and 5/8 inches from each respective terminal end of the stabilizer rack plate 1830.

The stabilizer plate apertures 1835 are formed so as to be aligned with, for example, a respective second strut tab aperture 1735 of a respective support strut 1700, such that the second strut tab 1730 of a respective support strut 1700 may be attached or coupled to the stabilizer rack plate 1830 via interaction of one or more portions of a fastener 1017 positioned through an aligned second strut tab aperture 1735 and a respective stabilizer plate aperture 1835.

A stabilizer bracket 1900 includes an elongate, substantially "L" shaped portion of material having a first stabilizer bracket portion 1910 and a second stabilizer bracket portion 1920. Generally, the first stabilizer bracket portion 1910 and the second stabilizer bracket portion 1920 extend from one another at approximately 90° relative to one another. In various exemplary embodiments, the stabilizer bracket 1900 is approximately 16 inches long (from a first terminal end to a second terminal end) and the first stabilizer bracket portion 1910 and the second stabilizer bracket portion 1920 each extend approximately 2 and ½ inches.

The first stabilizer bracket portion 1910 includes a plurality of first stabilizer bracket apertures 1915 formed through the first stabilizer bracket portion 1910 proximate a first terminal end portion and a second terminal end portion of the first stabilizer bracket portion 1910. In various exemplary embodiments, the first stabilizer bracket apertures 1915 are formed of half-inch diameter holes spaced apart from one another by approximately 2 inches on centers. In certain exemplary embodiments, the first stabilizer bracket apertures 1915 closest to the first and second terminal ends of the first stabilizer bracket portion 1910 are approximately 1 and 5/8 inches from each respective terminal end of the first stabilizer bracket portion 1910.

The first stabilizer bracket apertures 1915 are formed so as to be aligned with one or more accessory arm end plate aperture 1875 of a respective accessory arm end plate 1870. In this manner, a portion of the first stabilizer bracket portion 1910 may be aligned with an accessory arm end plate 1870, such that one or more accessory arm end plate apertures 1875 are aligned with one or more first stabilizer bracket apertures 1915. Once aligned, one or more portions of a mateable fastener 1017 may be positioned through the aligned accessory arm end plate aperture 1875 and first stabilizer bracket apertures 1915 so as to attach or couple a respective first stabilizer bracket portion 1910 to the accessory arm end plate 1870.

Figure 56:
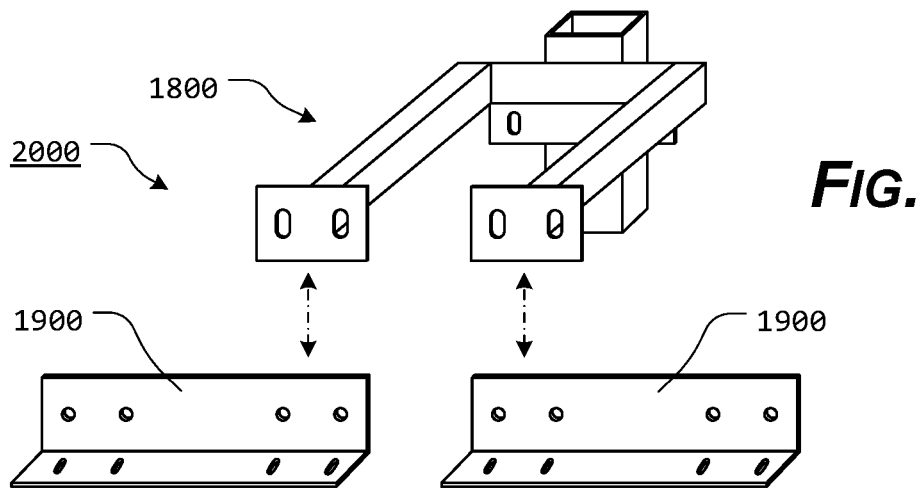
FIG. 56 illustrates a front perspective view of certain exemplary components of an exemplary embodiment of a brace rack of an accessory rack brace system, according to this disclosure.
Figure 57:
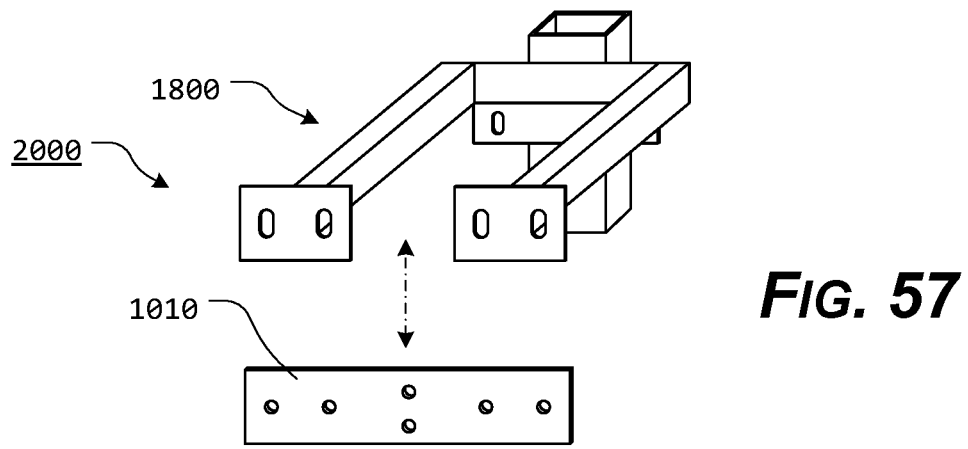
FIG. 57 illustrates a front perspective view of certain exemplary components of an exemplary embodiment of a brace rack of an accessory rack brace system, according to this disclosure.

As illustrated, for example, in FIG. 55, a single stabilizer bracket 1900 may be attached or coupled between adjacent accessory arm end plates 1870. Alternatively, as illustrated in FIG. 56, a respective stabilizer bracket 1900 may be attached or coupled to each adjacent accessory arm end plate 1870. In still other exemplary embodiments, as illustrated, for example, in FIG. 57, a stabilizer plate 1010 (with or without a bumper element 1012) may be attached or coupled between adjacent accessory arm end plates 1870.

The second stabilizer bracket portion 1920 includes a plurality of second stabilizer bracket apertures 1925 formed through the second stabilizer bracket portion 1920 proximate a first terminal end portion and a second terminal end portion of the second stabilizer bracket portion 1920.

In various exemplary embodiments, the second stabilizer bracket apertures 1925 are formed of ½ inch by 1½ inch ovals spaced apart from one another by approximately 3 inches on centers. In certain exemplary embodiments, the second stabilizer bracket apertures 1925 closest to the first and second terminal ends of the second stabilizer bracket portion 1920 are approximately 1 and 5/8 inches from each respective terminal end of the second stabilizer bracket portion 1920.

The second stabilizer bracket apertures 1925 are formed so as to be aligned with one or more bumper element apertures 1013 of a respective bumper element 1012. In this manner, a bumper element 1012 may be aligned with a portion of the second stabilizer bracket portion 1920, such that one or more bumper element apertures 1013 are aligned with one or more second stabilizer bracket apertures 1925. Once aligned, one or more portions of a mateable fastener 1017 may be positioned through the aligned bumper element apertures 1013 and second stabilizer bracket apertures 1925 so as to attach or couple a respective bumper element 1012 to the second stabilizer bracket portion 1920.

Figure 58:
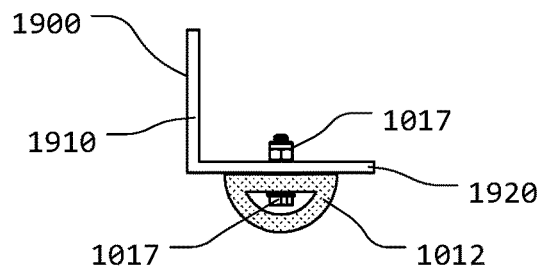
FIG. 58 illustrates a side view of certain exemplary components of an exemplary embodiment of a stabilizer bracket of an accessory rack brace system, according to this disclosure.
Figure 59:
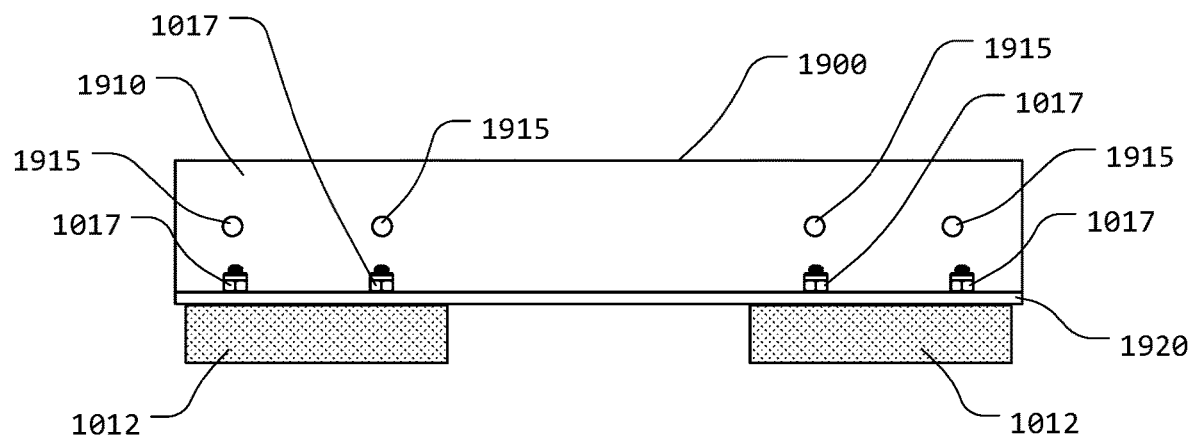
FIG. 59 illustrates a front view of certain exemplary components of an exemplary embodiment of a stabilizer bracket of an accessory rack brace system, according to this disclosure.

As illustrated, for example, in FIGS. 58-59, two bumper elements 1012 may be attached or coupled to the second stabilizer bracket portion 1920.

Figure 60:
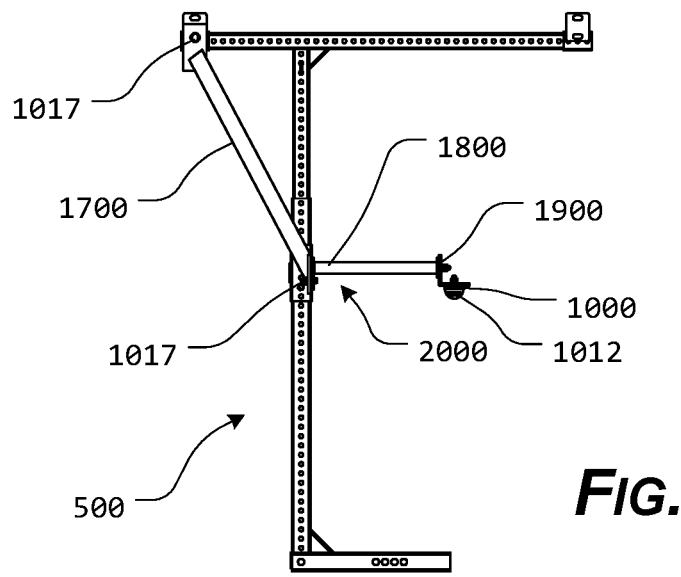
FIG. 60 illustrates a side view of an exemplary embodiment of a hitch mounted accessory rack system and an exemplary accessory rack brace system, according to this disclosure.
Figure 61:
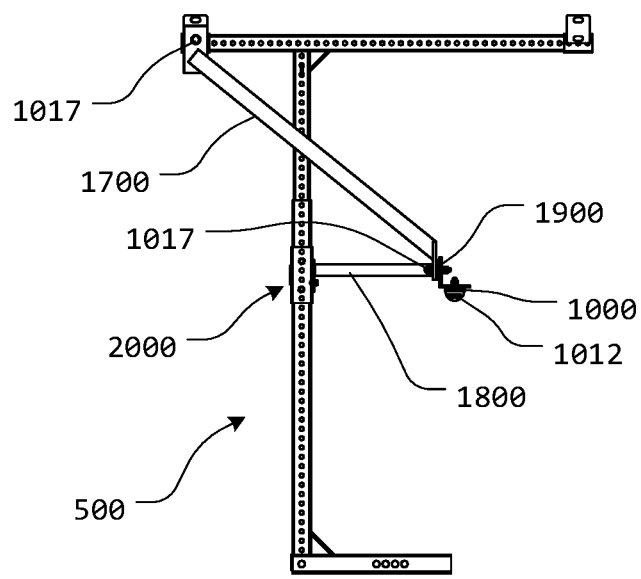
FIG. 61 illustrates a side view of an exemplary embodiment of a hitch mounted accessory rack system and an exemplary accessory rack brace system, according to this disclosure.
Figure 62:
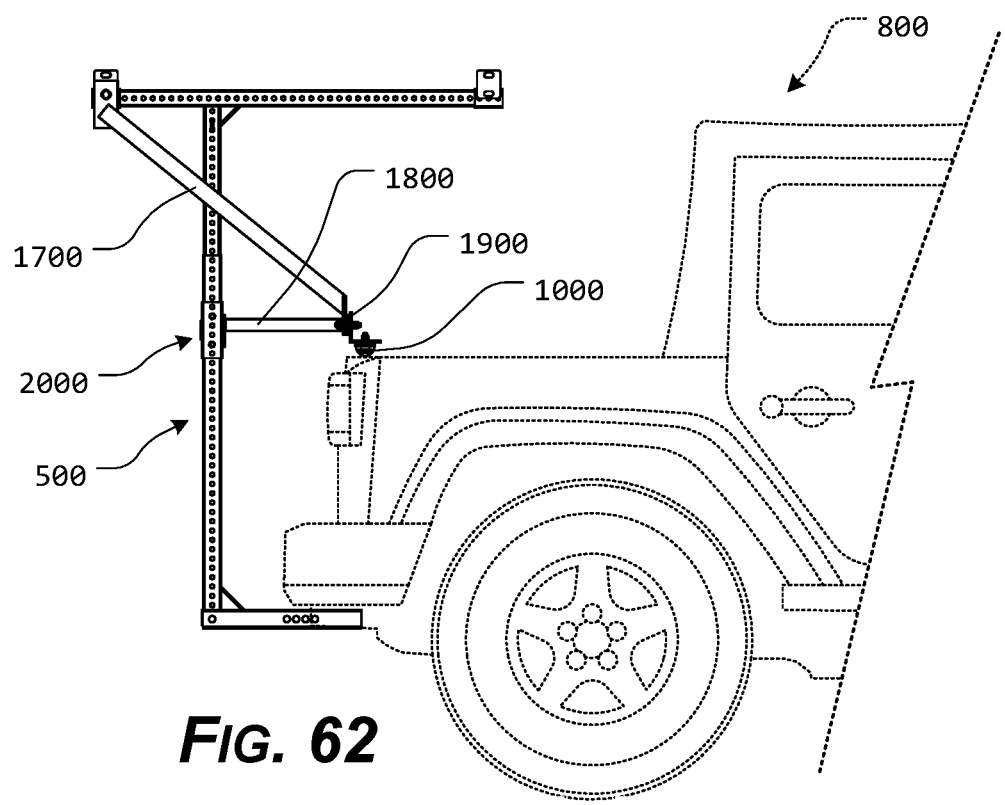
FIG. 62 illustrates a side view of an exemplary embodiment of a hitch mounted accessory rack system and an exemplary accessory rack brace system installed on an exemplary vehicle, according to this disclosure.

As illustrated most clearly in FIGS. 60-62, during use of the brace rack 2000, the brace rack 2000 may optionally be attached or coupled to a portion of the rack system 500 (such as, for example, the hitch beam vertical support 120) so as to extend from a portion of the rack system 500 and allow a portion of the one or more attached bumper elements 1012 to be urged against a surface of the vehicle 800 (and potentially not a spare tire), such as, for example, a horizontal surface of the vehicle, an upper portion of a tailgate, or other portion of the vehicle 800.

Figure 63:
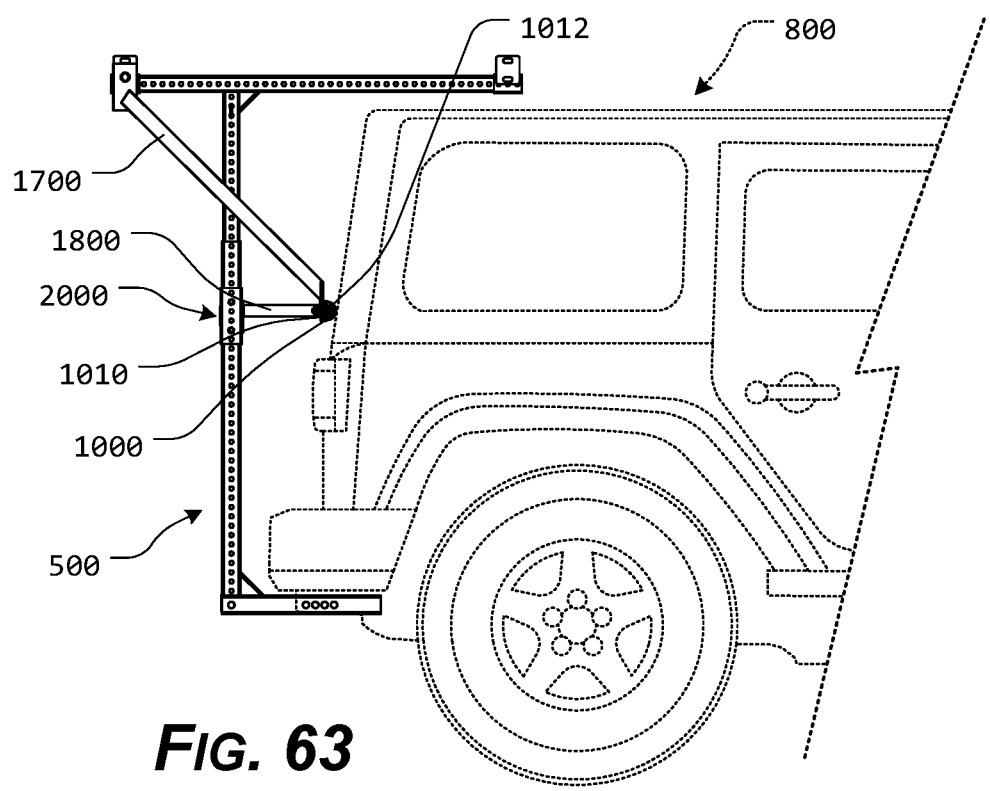
FIG. 63 illustrates a side view of an exemplary embodiment of a hitch mounted accessory rack system and an exemplary accessory rack brace system installed on an exemplary vehicle, according to this disclosure.

As illustrated in FIG. 63, during use of the brace rack 2000 (with the stabilizer plate 1010 replacing the stabilizer bracket 1900), the brace rack 2000 may optionally be attached or coupled to a portion of the rack system 500 (such as, for example, the hitch beam vertical support 120) so as to extend from a portion of the rack system 500 and allow a portion of the one or more attached bumper elements 1012 to be urged against a surface of the vehicle 800 (and potentially not a spare tire), such as, for example, a vertical or substantially vertical surface of the vehicle, a portion of a hatchback, liftgate, or other portion of the vehicle 800.

In this manner, when the rack system 500 is utilized, a degree of resilient tension is created between a portion of the vehicle 800 and the rack system 500, via the brace rack 2000 (and, more specifically, the bumper element(s) 1012), which aids in securing the rack system 500 to the vehicle 800 and aids in dampening any vibration, side to side movement, and/or forward and aft movement of the rack system 500 relative to the vehicle 800.

In various exemplary embodiments, certain components of the stabilizer rack 1800 and/or the stabilizer bracket 1900 are substantially rigid and are formed of steel. Alternate materials of construction of the various components of the stabilizer rack 1800 and/or the stabilizer bracket 1900 may include one or more of the following: stainless steel, aluminum, titanium, and/or other metals, various alloys and composites thereof, and/or various combinations of the foregoing. Thus, it should be understood that the material or materials used to form the various components of the stabilizer rack 1800 and/or the stabilizer bracket 1900 is a design choice based on the desired appearance and functionality of the stabilizer rack 1800 and/or the stabilizer bracket 1900.

It should be appreciated that certain elements of the stabilizer rack 1800 and/or the stabilizer bracket 1900 may be formed as an integral unit (such as, for example, the stabilizer rack 1800 and the stabilizer bracket 1900). Alternatively, suitable materials can be used and sections or elements made independently and attached or coupled together, such as by adhesives, welding, screws, rivets, pins, or other fasteners, to form the various elements of the stabilizer rack 1800 and/or the stabilizer bracket 1900.

It should also be understood that the overall size and shape of the stabilizer rack 1800 and/or the stabilizer bracket 1900, and the various portions thereof, is a design choice based upon the desired functionality and/or appearance of the stabilizer rack 1800 and/or the stabilizer bracket 1900.

In certain exemplary embodiments, as illustrated, for example, in in FIG. 60, the optional support struts 1700 may optionally be attached or coupled to a portion of the stabilizer rack plate 1830. Alternatively, as illustrated, for example, in in FIG. 61, the optional support struts 1700 may optionally be attached or coupled to a portion of the stabilizer bracket 1900. It should be appreciated that each of the optional support struts 1700 may be lengthened or shortened to be attached or coupled between a respective crossbar end plate 430 and a portion of the stabilizer plate 1010, a portion of the stabilizer rack plate 1830, or a portion of the stabilizer bracket 1900.

A more detailed explanation of the instructions regarding how to utilize the accessory rack brace system is not provided herein because it is believed that the level of description provided herein is sufficient to enable one of ordinary skill in the art to understand and practice the systems, methods, and apparatuses, as described.

While the present disclosure has been described in conjunction with the exemplary embodiments outlined above, the foregoing description of exemplary embodiments of the present disclosure, as set forth above, are intended to be illustrative, not limiting and the fundamental disclosed systems, methods, and/or apparatuses should not be considered to be necessarily so constrained. It is evident that the present disclosure is not limited to the particular variation set forth and many alternatives, adaptations modifications, and/or variations will be apparent to those skilled in the art.

Furthermore, where a range of values is provided, it is understood that every intervening value, between the upper and lower limit of that range and any other stated or intervening value in that stated range is encompassed within the present disclosure. The upper and lower limits of these smaller ranges may independently be included in the smaller ranges and is also encompassed within the present disclosure, subject to any specifically excluded limit in the stated range. Where the stated range includes one or both of the limits, ranges excluding either or both of those included limits are also included in the present disclosure.

It is to be understood that the phraseology of terminology employed herein is for the purpose of description and not of limitation. Unless defined otherwise, all technical and scientific terms used herein have the same meaning as commonly understood by one of ordinary skill in the art to which the present disclosure belongs.

In addition, it is contemplated that any optional feature of the inventive variations described herein may be set forth and claimed independently, or in combination with any one or more of the features described herein. Accordingly, the foregoing description of exemplary embodiments will reveal the general nature of the present disclosure, such that others may, by applying current knowledge, change, vary, modify, and/or adapt these exemplary, non-limiting embodiments for various applications without departing from the spirit and scope of the present disclosure and elements or methods similar or equivalent to those described herein can be used in practicing the present disclosure. Any and all such changes, variations, modifications, and/or adaptations should and are intended to be comprehended within the meaning and range of equivalents of the disclosed exemplary embodiments and may be substituted without departing from the true spirit and scope of the present disclosure.

Also, it is noted that as used herein and in the appended claims, the singular forms "a", "and", "said", and "the" include plural referents unless the context clearly dictates otherwise. Conversely, it is contemplated that the claims may be so-drafted to require singular elements or exclude any optional element indicated to be so here in the text or drawings. This statement is intended to serve as antecedent basis for use of such exclusive terminology as "solely", "only", and the like in connection with the recitation of claim elements or the use of a "negative" claim limitation(s).

What is claimed is:

1. An accessory rack brace system, comprising:
   a rack system having a lower base unit and an upper base unit;
   a stabilizer rack attached or coupled to said rack system, wherein said stabilizer rack extends from a portion of said lower base unit;
   a stabilizer plate, wherein a portion of said stabilizer plate is attached or coupled to said lower base unit of said rack system, via said stabilizer rack; and
   at least one bumper element, wherein each of said at least one bumper element is formed of a resilient portion of material, wherein said at least one bumper element is permanently or removably attached or coupled to a portion of said stabilizer plate, wherein said bumper element extends from a portion of said stabilizer plate and allows at least a portion of said bumper element to be urged against a surface to provide a degree of resilient tension between a portion of said surface and said rack system.

2. The accessory rack brace system of claim 1, wherein at least two bumper elements are permanently or removably attached or coupled to said stabilizer plate, at spaced apart locations.

3. The accessory rack brace system of claim 1, wherein said stabilizer plate is attached or coupled to a portion of said stabilizer plate via welding.

4. The accessory rack brace system of claim 1, wherein said stabilizer plate is attached or coupled to a hitch beam vertical support of said lower base unit.

5. The accessory rack brace system of claim 1, wherein said bumper element extends from a portion of said rack system and allows at least a portion of said bumper element to be urged against a surface of a vehicle to provide a degree of resilient tension between a portion of said surface of said vehicle and said rack system.

6. The accessory rack brace system of claim 1, wherein at least one support strut is attached or coupled between said stabilizer plate and a portion of said upper base unit.

7. The accessory rack brace system of claim 1, wherein at least one support strut is attached or coupled between said stabilizer plate and a crossbar of said upper base unit.

8. An accessory rack brace system, comprising:
a rack system having a lower base unit, an upper base unit, and a sleeve element;
a stabilizer rack attached or coupled to said rack system, wherein said stabilizer rack includes a rack arm beam and a rack accessory arm extending from opposing ends or end portions of said rack arm beam, wherein a respective accessory arm end plate is attached or coupled to each respective terminal end of each of said rack accessory arms;
at least one stabilizer bracket, wherein said at least one stabilizer bracket includes a first stabilizer bracket portion and a second stabilizer bracket portion, wherein a portion of said first stabilizer bracket portion of said at least one stabilizer bracket is attached or coupled to at least one of said accessory arm end plates; and
at least one bumper element, wherein each of said at least one bumper element is formed of a resilient portion of material, wherein said at least one bumper element is permanently or removably attached or coupled to a portion of said second stabilizer bracket portion, wherein said bumper element extends from a portion of said second stabilizer bracket portion and allows at least a portion of said bumper element to be urged against a surface to provide a degree of resilient tension between a portion of said surface and said rack system.

9. The accessory rack brace system of claim 8, wherein said stabilizer rack is attached or coupled to said rack system via a sleeve element.

10. The accessory rack brace system of claim 8, wherein said rack accessory arms extend from said rack arm beam, such that said longitudinal axes, AL, of said rack accessory arms are each substantially parallel to one another.

11. The accessory rack brace system of claim 8, further comprising at least two stabilizer brackets, wherein a respective portion of each of said at least two stabilizer brackets is attached or coupled to a respective one of said accessory arm end plates.

12. The accessory rack brace system of claim 8, wherein at least one support strut is attached or coupled between said stabilizer rack and a portion of said upper base unit.

13. The accessory rack brace system of claim 8, wherein at least one support strut is attached or coupled between said stabilizer rack and a crossbar of said upper base unit.

14. The accessory rack brace system of claim 8, wherein at least one support strut is attached or coupled between said stabilizer bracket and a portion of said upper base unit.

15. The accessory rack brace system of claim 8, wherein at least one support strut is attached or coupled between said stabilizer bracket and a crossbar of said upper base unit.

16. An accessory rack brace system, comprising:
a rack system having a lower base unit, an upper base unit, and a sleeve element;
a stabilizer rack attached or coupled to said rack system, wherein said stabilizer rack includes a rack arm beam and a rack accessory arm extending from opposing ends or end portions of said rack arm beam, wherein a respective accessory arm end plate is attached or coupled to each respective terminal end of each of said rack accessory arms;
at least one stabilizer plate, wherein a portion of said stabilizer plate is attached or coupled to each of said accessory arm end plates; and
at least one bumper element, wherein each of said at least one bumper element is formed of a resilient portion of material, wherein said at least one bumper element is permanently or removably attached or coupled to a portion of said stabilizer plate, wherein said bumper element extends from a portion of said stabilizer plate and allows at least a portion of said bumper element to be urged against a surface to provide a degree of resilient tension between a portion of said surface and said rack system.

17. The accessory rack brace system of claim 16, wherein at least one support strut is attached or coupled between said stabilizer rack and a portion of said upper base unit.

18. The accessory rack brace system of claim 16, wherein at least one support strut is attached or coupled between said stabilizer rack and a crossbar of said upper base unit.

19. The accessory rack brace system of claim 16, wherein at least one support strut is attached or coupled between said stabilizer plate and a portion of said upper base unit.

20. The accessory rack brace system of claim 16, wherein at least one support strut is attached or coupled between said stabilizer plate and a crossbar of said upper base unit.

* * * * *